US012809468B2

(12) United States Patent
Yoshida et al.

(10) Patent No.: US 12,809,468 B2
(45) Date of Patent: Nov. 24, 2026

(54) TACTILE SENSATION PRESENTING DEVICE

(71) Applicant: Sharp Display Technology Corporation, Kameyama City (JP)

(72) Inventors: Tomonori Yoshida, Kameyama City (JP); Yasuhiro Sugita, Kameyama City (JP); Masafumi Ueno, Kameyama City (JP); Takuma Yamamoto, Kameyama City (JP)

(73) Assignee: SHARP DISPLAY TECHNOLOGY CORPORATION, Kameyama City (JP)

( * ) Notice: Subject to any disclaimer, the term of this patent is extended or adjusted under 35 U.S.C. 154(b) by 252 days.

(21) Appl. No.: 18/829,645

(22) Filed: Sep. 10, 2024

(65) Prior Publication Data

US 2025/0085782 A1 Mar. 13, 2025

(30) Foreign Application Priority Data

Sep. 11, 2023 (JP) ................................ 2023-147196
May 16, 2024 (JP) ................................ 2024-080073

(51) Int. Cl.
*G06F 3/01* (2006.01)
*G08B 6/00* (2006.01)

(52) U.S. Cl.
CPC ............... *G06F 3/016* (2013.01); *G08B 6/00* (2013.01)

(58) Field of Classification Search
CPC ................................ G06F 3/016; G08B 6/00
See application file for complete search history.

(56) References Cited

U.S. PATENT DOCUMENTS

| | | | | |
|---|---|---|---|---|
| 10,592,057 | B1 * | 3/2020 | Tan | G06F 3/0414 |
| 2009/0174671 | A1 | 7/2009 | Tachi et al. | |
| 2019/0204955 | A1 * | 7/2019 | Haga | G06F 3/0416 |
| 2022/0276712 | A1 * | 9/2022 | Orita | G06F 3/016 |
| 2025/0140087 | A1 * | 5/2025 | Ueno | G08B 6/00 |
| 2025/0196189 | A1 * | 6/2025 | Yoshida | B06B 1/0692 |
| 2026/0151794 | A1 * | 6/2026 | Tanaka | B06B 1/0215 |

FOREIGN PATENT DOCUMENTS

| | | | |
|---|---|---|---|
| JP | 2006251948 | A | 9/2006 |
| WO | 0138958 | A1 | 5/2001 |

* cited by examiner

*Primary Examiner* — Dmitriy Bolotin
(74) *Attorney, Agent, or Firm* — Keating & Bennett, LLP

(57) ABSTRACT

A tactile sensation presenting device includes a tactile sensation presenting section and a control section. The tactile sensation presenting section includes anodic and cathodic electrodes. The control section can switch each anodic electrode between a first state (anodic potential) and a second state (floating potential) and can switch each cathodic electrode between a third state (cathodic potential) and a fourth state (floating potential). The control section controls the tactile sensation presenting section such that at least any one of the anodic electrodes is in the first state, with the others in the second state, at least one of the cathodic electrodes at least within a distance of 1.0 mm or less from the first-state anodic electrode is in the fourth state, with the others in the third state, and a total area of the first-state anodic electrode and the third-state cathodic electrodes is equal to or greater than 0.7 $cm^2$.

10 Claims, 19 Drawing Sheets

TACTILE SENSATION PRESENTING DEVICE

BACKGROUND

1. Technical Field

The present invention relates to tactile sensation presenting devices and particularly to tactile sensation presenting devices configured to present tactile sensations by electrical stimulation.

2. Description of the Related Art

In recent years, tactile sensation presenting devices capable of presenting tactile sensations to a user (also referred to as "haptics devices") have been receiving attention and have already been applied to a variety of uses, such as medical, educational, entertainment, and remote operation uses. Several types of tactile sensation presenting devices have been known. The tactile sensation presenting devices most widely used nowadays are force application type tactile sensation presenting devices that are configured to present tactile sensations by applying force to a user and vibration type tactile sensation presenting devices that are configured to present tactile sensations by transmitting vibrations to a user. Recently, electrical stimulation type tactile sensation presenting devices that are configured to present tactile sensations by electrical stimulation are promising. An electrical stimulation type tactile sensation presenting device is disclosed in, for example, Japanese Laid-Open Patent Publication No. 2006-251948.

SUMMARY

In the electrical stimulation type tactile sensation presenting device, a plurality of electrodes are arrayed with a predetermined pitch in a portion that is to come into contact with user's skin, and current paths from anodes to cathodes are formed under the skin, whereby sensory receptors under the skin (e.g., Meissner's corpuscles) are stimulated to present tactile sensations. In the tactile sensation presenting device of such a type, it is expected that the resolution of tactile sensations can be increased by reducing the array pitch of the electrodes.

However, the present inventors conducted a detailed study and found that, when the array pitch of the electrodes is reduced, there is a probability that users will not feel tactile sensations even if the area of the electrodes is maintained.

In the tactile sensation presenting device disclosed in Japanese Laid-Open Patent Publication No. 2006-251948, each of the electrodes is switched between the state of being coupled with the power supply (the state where the electrode functions as an anode) and the state of being coupled with GND (the state where the electrode functions as a cathode). However, in such a configuration that each electrode is switched between the state where the electrode functions as an anode and the state where the electrode functions as a cathode, both circuitry and driving are complicated, leading to increase in size and manufacturing cost of the device, and thus there is a probability that the mass productivity will decrease.

Embodiments of the present invention were conceived in view of the above-described problems and are directed to providing tactile sensation presenting devices that are capable of suitably presenting tactile sensations even when the array pitch of electrodes for providing electrical stimulation is relatively small and that are excellent in mass productivity.

This specification discloses tactile sensation presenting devices described in the following items.

[Item 1]

A tactile sensation presenting device comprising:

at least one tactile sensation presenting section capable of presenting a tactile sensation by electrical stimulation; and a control section capable of controlling the at least one tactile sensation presenting section, wherein each of the at least one tactile sensation presenting section includes a support having a major surface, a plurality of anodic electrodes provided on the major surface of the support, the plurality of anodic electrodes being arrayed in a matrix with an array pitch of 1.5 mm or smaller, and a plurality of cathodic electrodes provided on the major surface of the support so as not to overlap the plurality of anodic electrodes as viewed in plan, the plurality of cathodic electrodes being arrayed with an array pitch equal to or greater than the array pitch of the plurality of anodic electrodes, each of the plurality of cathodic electrodes having a greater area than each of the plurality of anodic electrodes, wherein the control section is capable of independently switching each of the plurality of anodic electrodes between a first state where the anodic electrode is supplied with an anodic potential and a second state where the anodic electrode is supplied with a floating potential and the control section is capable of independently switching each of the plurality of cathodic electrodes between a third state where the cathodic electrode is supplied with a cathodic potential and a fourth state where the cathodic electrode is supplied with a floating potential, and wherein when the tactile sensation presenting section presents a tactile sensation, the control section controls the tactile sensation presenting section such that at least any one of the plurality of anodic electrodes is in the first state, the other anodic electrodes than the first-state anodic electrode are in the second state, at least one of the plurality of cathodic electrodes which is at least within a distance of 1.0 mm or less from the first-state anodic electrode is in the fourth state, the other cathodic electrodes than the fourth-state cathodic electrode are in the third state, and a total area of the first-state anodic electrode and the third-state cathodic electrodes is equal to or greater than 0.7 $cm^2$.

[Item 2]

The tactile sensation presenting device of Item 1, wherein the plurality of anodic electrodes are made of gold, platinum, titanium, a carbon-based material, or an electrically-conductive metal oxide.

[Item 3]

The tactile sensation presenting device of Item 1 or 2, wherein the array pitch of the plurality of cathodic electrodes is greater than the array pitch of the plurality of anodic electrodes.

[Item 4]

The tactile sensation presenting device of any of Items 1 to 3, wherein the number of the plurality of cathodic electrodes is equal to or smaller than the number of the plurality of anodic electrodes.

[Item 5]

The tactile sensation presenting device of any of Items 1 to 3, wherein the number of the plurality of cathodic electrodes is smaller than the number of the plurality of anodic electrodes.

[Item 6]

The tactile sensation presenting device of any of Items 1 to 5, wherein each of the plurality of cathodic electrodes has such a shape that surrounds at least one of the plurality of anodic electrodes as viewed in plan.

[Item 7]

The tactile sensation presenting device of Item 6, wherein each of the plurality of cathodic electrodes has such a shape that surrounds two or more of the plurality of anodic electrodes as viewed in plan.

[Item 8]

The tactile sensation presenting device of any of Items 1 to 7, wherein the plurality of cathodic electrodes are arrayed in a matrix.

[Item 9]

The tactile sensation presenting device of any of Items 1 to 7, wherein the plurality of cathodic electrodes are arrayed in a single row and a plurality of columns, each of the plurality of cathodic electrodes having such a shape whose longitudinal direction is defined in a column direction.

[Item 10]

The tactile sensation presenting device of any of Items 1 to 9, wherein the at least one tactile sensation presenting section presents a tactile sensation by electrical stimulation at a fingertip inner portion of a corresponding finger.

According to embodiments of the present invention, tactile sensation presenting devices can be provided that are capable of suitably presenting tactile sensations even when the array pitch of electrodes for providing electrical stimulation is relatively small and that are excellent in mass productivity.

DETAILED DESCRIPTION

Hereinafter, embodiments of the present invention are described with reference to the drawings. Note that the present invention is not limited to the embodiments described below.

Embodiment 1

Figure 1:
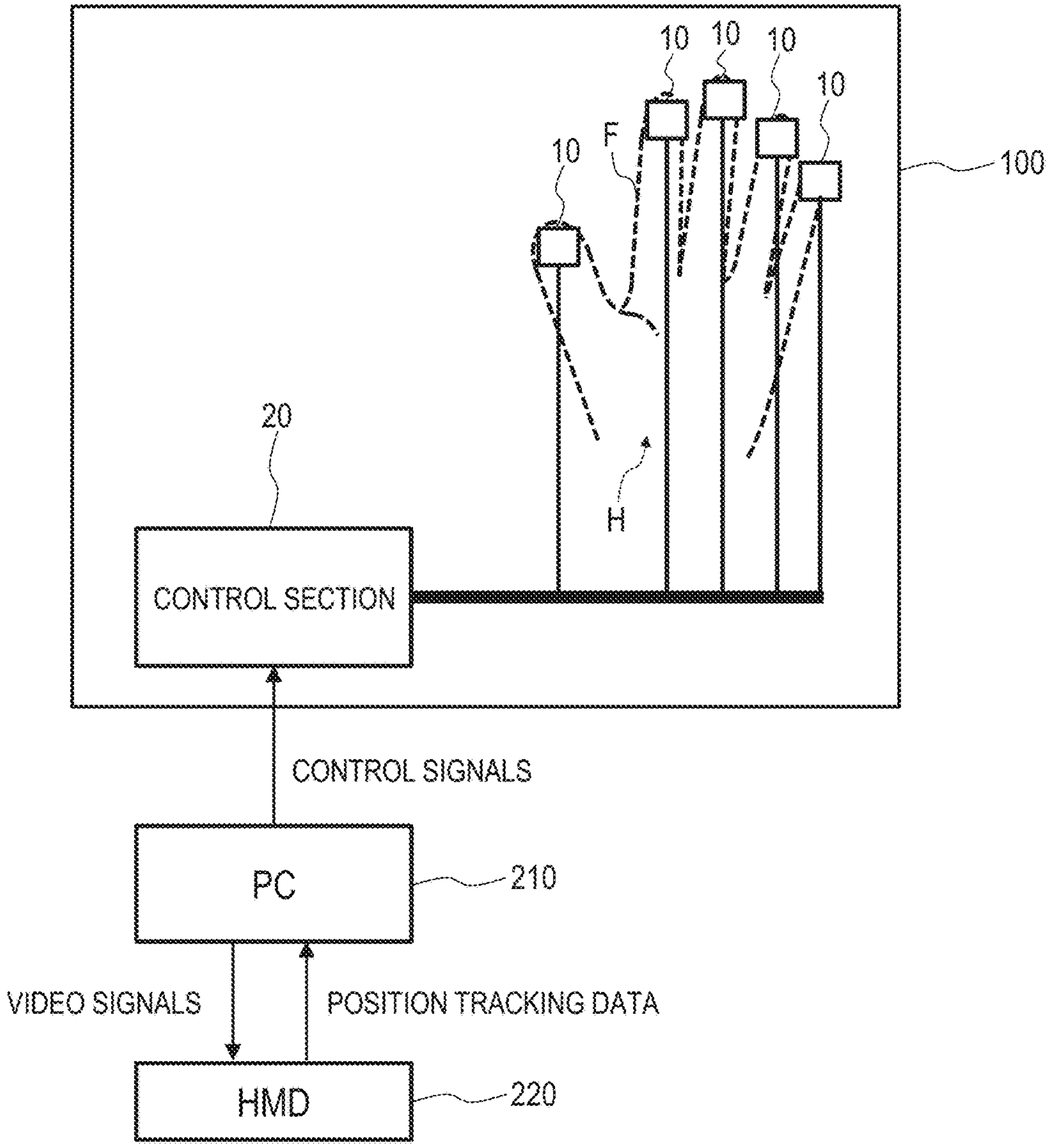
FIG. 1 is a block diagram schematically showing a tactile sensation presenting device 100 according to an embodiment of the present invention.
Figure 2:
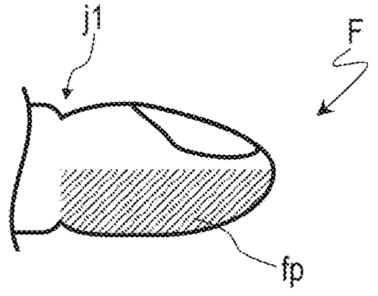
FIG. 2 is diagram for illustrating a fingertip inner portion fp.

A tactile sensation presenting device 100 of the present embodiment is described with reference to FIG. 1 and FIG. 2. FIG. 1 is a block diagram schematically showing the tactile sensation presenting device 100. FIG. 1 also shows a personal computer (PC) 210 and a head mounted display (HMD) 220 in addition to the tactile sensation presenting device 100.

As shown in FIG. 1, the tactile sensation presenting device 100 includes at least one tactile sensation presenting section 10 and a control section 20 that is capable of controlling the at least one tactile sensation presenting section 10. In the illustrated example, the tactile sensation presenting device 100 includes a plurality of, more specifically five, tactile sensation presenting sections 10. Note that the number of tactile sensation presenting sections 10 is not limited to 5.

When the tactile sensation presenting device 100 is used, the five tactile sensation presenting sections 10 are provided so as to be in contact with the fingertips of five fingers F of a user's hand H (drawn by broken lines in FIG. 1). Each of the tactile sensation presenting sections 10 presents tactile sensations by electrical stimulation to the fingertip inner portion of a single finger F. Herein, the "fingertip inner portion" refers to a part fp of the finger F which is located beyond the first joint (distal joint) j1 of the finger F and which is located on the palm side relative to the center when the finger F is viewed from the side as shown in FIG. 2.

The control section 20 controls the tactile sensation presenting sections 10. The control section 20 controls the tactile sensation presenting sections 10 based on control signals transmitted from the PC 210. The data transmission between the control section 20 and the PC 210 may be realized by wireless communication or wired communication. The wireless communication and wired communication can be established in compliance with various known communication standards. The control section 20 is realized by, for example, a microcomputer.

The tactile sensation presenting sections 10 are wired using flexible boards, wires, and the like, so as not to obstruct the movement of the hand H. The control section 20 can be provided at, for example, a portion corresponding to a user's arm. The tactile sensation presenting sections 10 and the control section 20 may be integrated in the form of a glove.

The PC 210 outputs video signals to the HMD 220, and the HMD 220 displays a video based on the received video signals. The HMD 220 also outputs position tracking data, which is information about the position of the HMD 220, and the like, to the PC 210. The data transmission between the PC 210 and the HMD 220 may be realized by wireless communication or wired communication. The PC 210 may be provided outside the HMD 220 or may be incorporated in the HMD 220.

Note that, in the example described herein, the tactile sensation presenting device 100 presents tactile sensations in conjunction with a video displayed by the HMD 220, although the use of the tactile sensation presenting device 100 is not limited to this example.

Figure 3:
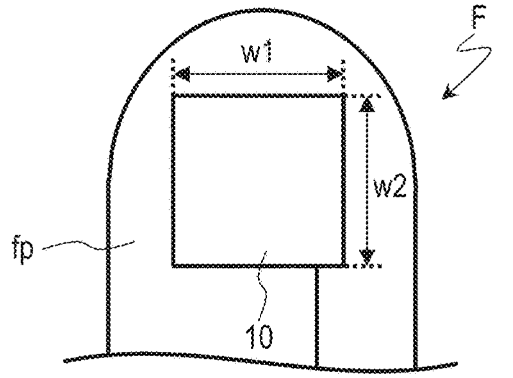
FIG. 3 is a plan view showing a tactile sensation presenting section 10 of the tactile sensation presenting device 100, which is located on the fingertip inner portion fp.
Figure 4:
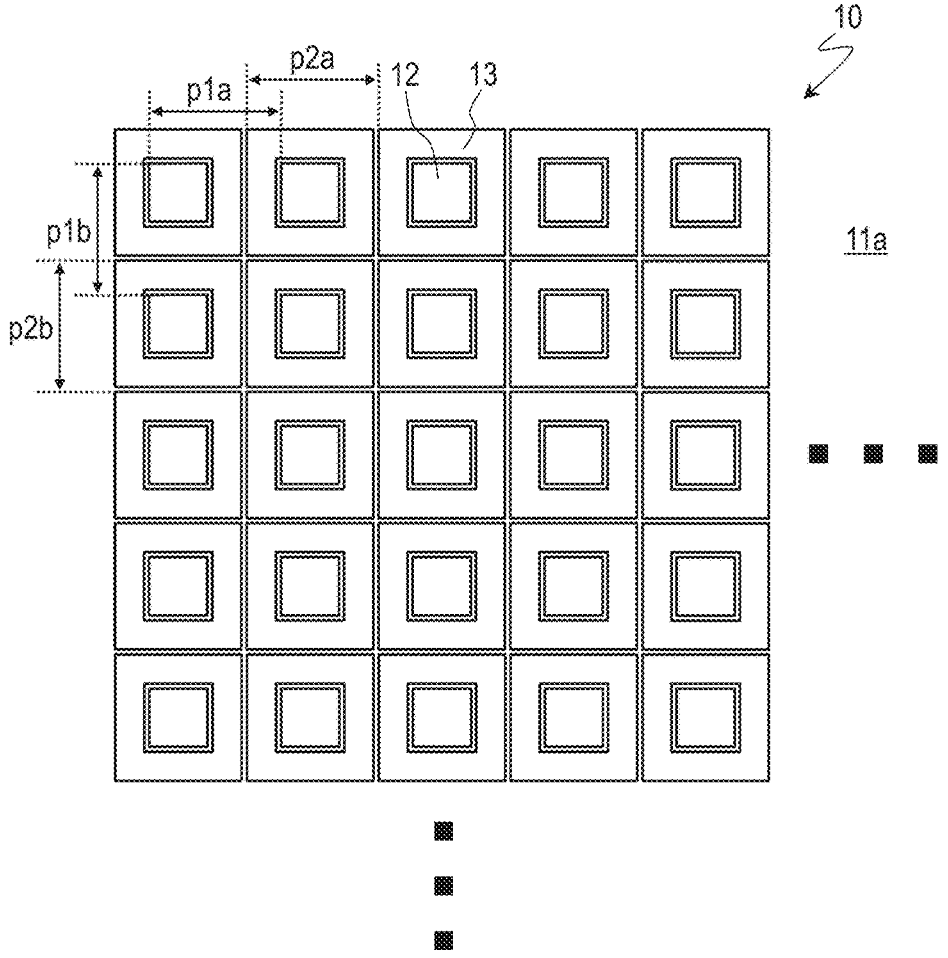
FIG. 4 is an enlarged plan view showing the tactile sensation presenting section 10.
Figure 5:
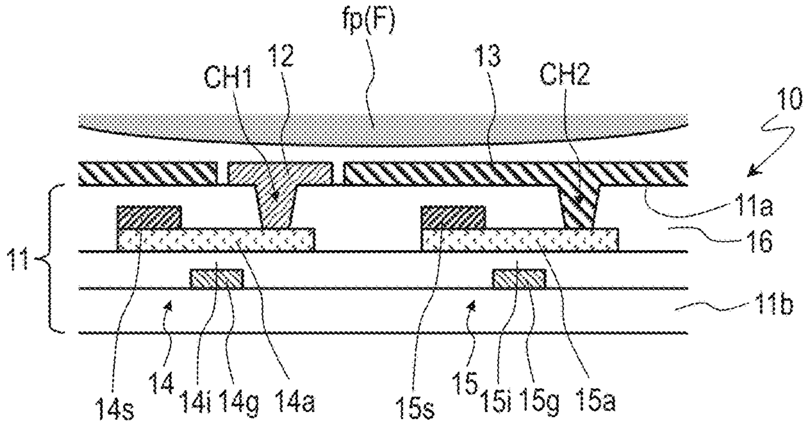
FIG. 5 is a cross-sectional view schematically showing the tactile sensation presenting section 10.
Figure 6:
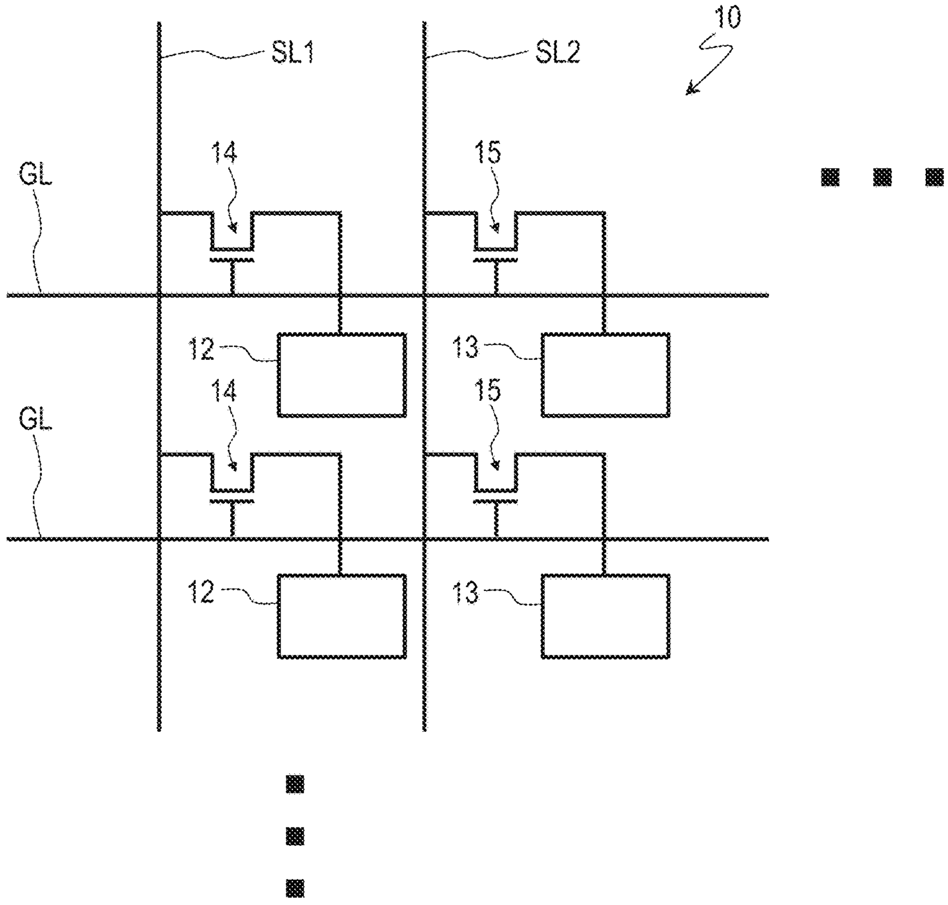
FIG. 6 shows the equivalent circuit of the tactile sensation presenting section 10.

A specific configuration of the tactile sensation presenting section 10 is described with reference to FIG. 3, FIG. 4, FIG. 5 and FIG. 6. FIG. 3 is a plan view showing the tactile sensation presenting section 10, which is located on the fingertip inner portion fp. FIG. 4 is an enlarged plan view showing the tactile sensation presenting section 10. FIG. 5 is a cross-sectional view schematically showing the tactile sensation presenting section 10. FIG. 6 shows the equivalent circuit of the tactile sensation presenting section 10.

In the example shown in FIG. 3, each of the tactile sensation presenting sections 10 has a generally rectangular shape as viewed in plan. The ratio between the transverse dimension (width w1) and the longitudinal dimension (width w2) of the tactile sensation presenting section 10 is not particularly limited. Note that the shape of the tactile sensation presenting sections 10 is not limited to generally rectangular shapes.

Each of the tactile sensation presenting sections 10 includes an array board (support) 11 having a major surface 11*a*, a plurality of electrodes for anode (hereinafter, referred to as "anodic electrodes 12"), and a plurality of electrodes for cathode (hereinafter, referred to as "cathodic electrodes 13") as shown in FIG. 4 and FIG. 5.

The plurality of anodic electrodes 12 are provided on the major surface 11*a* of the array board 11. The plurality of anodic electrodes 12 are arrayed in a matrix. In this specification, for convenience, one of the two array directions of the anodic electrodes 12 is referred to as "row direction", and the other as "column direction".

The array pitch of the anodic electrodes 12 is equal to or smaller than 1.5 mm. Specifically, the array pitch p1*a* along the row direction and the array pitch p1*b* along the column direction of the anodic electrodes 12 are each equal to or smaller than 1.5 mm. When the array pitches of the anodic electrodes 12 are each equal to or smaller than 1.5 mm, the resolution of tactile sensations can be sufficiently improved.

The plurality of cathodic electrodes 13 are provided on the major surface 11*a* of the array board 11 so as not to overlap the anodic electrodes 12 as viewed in plan. The plurality of cathodic electrodes 13 are also arrayed in a matrix.

The array pitches of the cathodic electrodes 13 are equal to the array pitches of the anodic electrodes 12. Specifically, the array pitch p2*a* along the row direction of the cathodic electrodes 13 is equal to the array pitch p1*a* along the row direction of the anodic electrodes 12, and the array pitch p2*b* along the column direction of the cathodic electrodes 13 is equal to the array pitch p1*b* along the column direction of the anodic electrodes 12.

The area of each cathodic electrode 13 is different from the area of each anodic electrode 12. More specifically, the area of each cathodic electrode 13 is greater than the area of each anodic electrode 12.

Each of the cathodic electrodes 13 has such a shape that surrounds a single anodic electrode 12 as viewed in plan. In the illustrated example, each of the anodic electrodes 12 has a generally rectangular shape, and each of the cathodic electrodes 13 has such a generally quadrangular frame-like shape that surrounds a single anodic electrode 12. In the present embodiment, the number of cathodic electrodes 13 is equal to that of the anodic electrodes 12. Note that the shape of the anodic electrodes 12 is not limited to the generally rectangular shape described herein but may be, for example, a generally circular shape, a generally elliptical shape, or a generally polygonal shape other than the generally rectangular shape. Likewise, the shape of the cathodic electrodes 13 is not limited to the generally quadrangular frame-like shape described herein.

The array board 11 supports the anodic electrodes 12 and the cathodic electrodes 13. The array board 11 may have flexibility as a whole. The array board 11 includes a plurality of gate lines GL, a plurality of first source lines SL1, a plurality of second source lines SL2, a plurality of first TFTs 14 and a plurality of second TFTs 15, and a substrate 11*b* supporting these elements.

The plurality of gate lines GL extend in a certain direction (for example, one of the row direction and the column direction). The plurality of first source lines SL1 and the plurality of second source lines SL2 extend in a direction not parallel to the direction in which the gate lines GL extend (for example, the other of the row direction and the column direction).

Each of the plurality of first TFTs 14 is provided for a corresponding one of the plurality of anodic electrodes 12. The first TFT 14 includes a gate electrode 14*g*, a gate insulating layer 14*i*, a semiconductor layer 14*a* and a source electrode 14*s*. The gate electrode 14*g* is electrically coupled with a corresponding one of the gate lines GL. The gate insulating layer 14*i* is provided so as to cover the gate electrode 14*g*. The semiconductor layer 14*a* is provided on the gate insulating layer 14*i* so as to oppose the gate electrode 14*g* with the gate insulating layer 14*i* interposed therebetween. The material of the semiconductor layer 14*a* is not particularly limited. The source electrode 14*s* is electrically coupled with the semiconductor layer 14*a*. The source electrode 14*s* is electrically coupled with a corresponding one of the first source lines SL1.

Each of the plurality of second TFTs 15 is provided for a corresponding one of the plurality of cathodic electrodes 13. The second TFT 15 includes a gate electrode 15*g*, a gate insulating layer 15*i*, a semiconductor layer 15*a* and a source electrode 15*s*. The gate electrode 15*g* is electrically coupled with a corresponding one of the gate lines GL. The gate insulating layer 15*i* is provided so as to cover the gate electrode 15*g*. The semiconductor layer 15*a* is provided on the gate insulating layer 15*i* so as to oppose the gate electrode 15*g* with the gate insulating layer 15*i* interposed therebetween. The material of the semiconductor layer 15*a* is not particularly limited. The source electrode 15*s* is electrically coupled with the semiconductor layer 15*a*. The source electrode 15*s* is electrically coupled with a corresponding one of the second source lines SL2.

An interlayer insulating layer 16 is provided so as to cover the first TFT 14 and the second TFT 15, and the anodic electrode 12 and the cathodic electrode 13 are provided on the interlayer insulating layer 16. The interlayer insulating layer 16 has a first contact hole CH1 through which the semiconductor layer 14*a* of the first TFT 14 is partially exposed, and a second contact hole CH2 through which the semiconductor layer 15*a* of the second TFT 15 is partially exposed.

The anodic electrode 12 is electrically coupled with the semiconductor layer 14*a* of the first TFT 14 at the first contact hole CH1. The anodic electrode 12 is supplied with a predetermined anodic potential from the first source line SL1 via the first TFT 14. The first source line SL1 is coupled with, for example, the power supply and, in this case, the anodic potential is the power supply potential.

The cathodic electrode 13 is electrically coupled with the semiconductor layer 15*a* of the second TFT 15 at the second contact hole CH2. The cathodic electrode 13 is supplied with a predetermined cathodic potential, which is lower than the anodic potential, from the second source line SL2 via the second TFT 15. The second source line SL2 is coupled with, for example, the ground (GND) and, in this case, the cathodic potential is the ground potential.

The tactile sensation presenting section 10 that has the above-described configuration is controlled by the control section 20 as described below.

The control section 20 is capable of independently switching each of the plurality of anodic electrodes 12 between a state where the anodic electrode 12 is supplied with the anodic potential (hereinafter, referred to as "first state") and a state where the anodic electrode 12 is supplied with a floating potential (hereinafter, referred to as "second state"). Also, the control section 20 is capable of independently switching each of the plurality of cathodic electrodes 13 between a state where the cathodic electrode 13 is supplied with the cathodic potential (hereinafter, referred to as "third state") and a state where the cathodic electrode 13 is supplied with a floating potential (hereinafter, referred to as "fourth state"). The control section 20 can appropriately perform such switching so that tactile sensations can be presented at a desired portion of the tactile sensation presenting section 10.

When the tactile sensation presenting section 10 presents tactile sensations, the control section 20 controls the tactile sensation presenting section 10 such that, specifically, the following conditions [1] to [5] are satisfied.

[1] At least any one of the plurality of anodic electrodes 12 is in the "first state" (i.e., supplied with the anodic potential). Herein, the anodic electrode(s) 12 in the first state (hereinafter, referred to as "first-state anodic electrode(s) 12") is an anodic electrode 12 located at a portion of the tactile sensation presenting section 10 in which the control section 20 intends to present tactile sensations.

[2] The other anodic electrodes 12 than the first-state anodic electrode(s) 12 are in the "second state" (i.e., supplied with a floating potential).

[3] At least one of the plurality of cathodic electrodes 13 which is at least within the distance of 1.0 mm or less from the first-state anodic electrode(s) 12 is in the "fourth state" (i.e., supplied with a floating potential).

[4] The other cathodic electrodes 13 than the fourth-state cathodic electrode 13 are in the "third state" (i.e., supplied with the cathodic potential).

[5] The total area of the first-state anodic electrode(s) 12 and the third-state cathodic electrodes 13 (i.e., the total area of electrodes that function as the anodes and the cathodes) is equal to or greater than 0.7 $cm^2$.

While the above-described conditions [1] to [5] are satisfied, presentation of tactile sensations can be suitably performed even if the array pitch of the electrodes is relatively small (specifically equal to or smaller than 1.5 mm), as understood from the results of verification which will be described later.

Figure 7A:
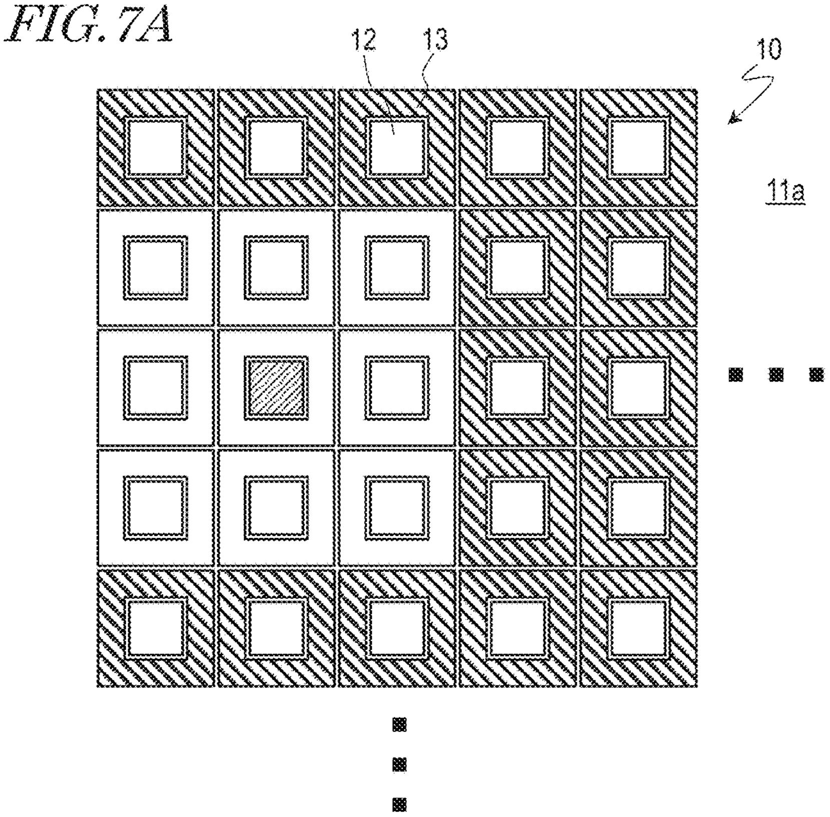
FIG. 7A shows the state (supplied potentials) of anodic electrodes 12 and cathodic electrodes 13 while the tactile sensation presenting section 10 presents a tactile sensation.
Figure 7B:
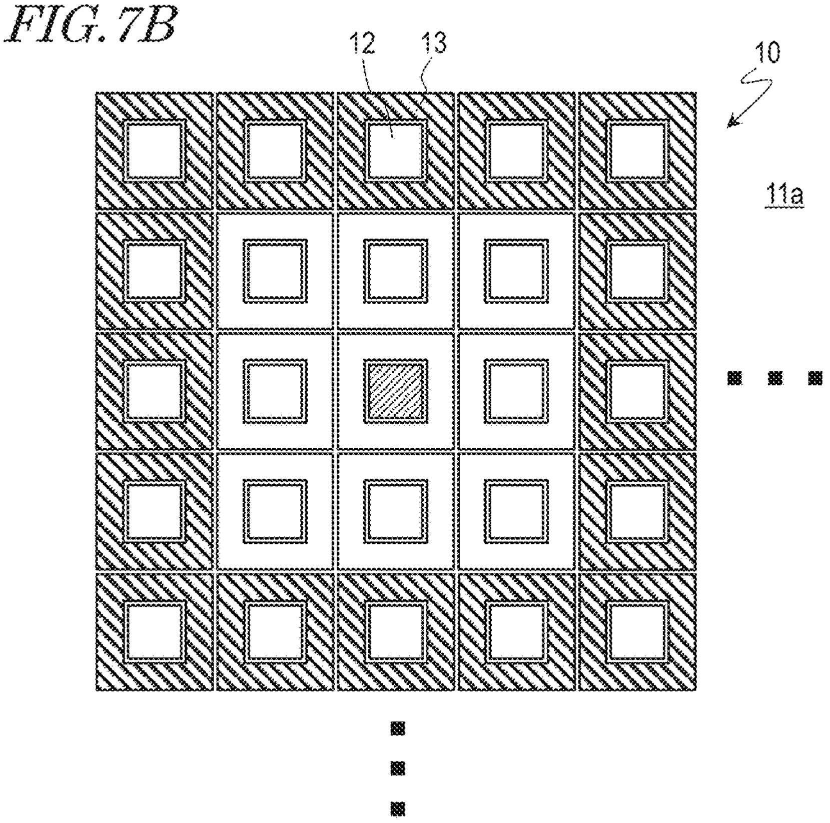
FIG. 7B shows the state (supplied potentials) of the anodic electrodes 12 and the cathodic electrodes 13 while the tactile sensation presenting section 10 presents a tactile sensation.

Herein, an example of the control performed by the control section 20 when the tactile sensation presenting section 10 presents tactile sensations is described with reference to FIG. 7A and FIG. 7B. FIG. 7A and FIG. 7B show the state (supplied potentials) of the anodic electrodes 12 and the cathodic electrodes 13 of the tactile sensation presenting section 10. FIG. 7A illustrates a case where a tactile sensation is presented at a portion of the tactile sensation presenting section 10 corresponding to the anodic electrode 12 located at the intersection of the third row and the second column in the shown matrix. FIG. 7B illustrates a case where a tactile sensation is presented at a portion of the tactile sensation presenting section 10 corresponding to the anodic electrode 12 located at the intersection of the third row and the third column in the shown matrix. In FIG. 7A and FIG. 7B, the first-state anodic electrodes 12 (i.e., the anodic electrodes 12 supplied with the anodic potential) are hatched with diagonal lines descending to the left, and the third-state cathodic electrodes 13 (i.e., the cathodic electrodes 13 supplied with the cathodic potential) are hatched with diagonal lines descending to the right.

In this example, the area of each of the tactile sensation presenting sections 10 is 1.103 $cm^2$ (the transverse dimension (width w1) and the longitudinal dimension (width w2) are each 1.050 cm). The anodic electrodes 12 have the length of 0.067 cm on each side, the area of 0.0045 $cm^2$, and the array pitch of 0.1500 cm. The cathodic electrodes 13 have the length of 0.1490 cm on each side of the periphery, the area of 0.0175 $cm^2$, and the array pitch of 0.1500 cm. The gap between the anodic electrodes 12 and the cathodic electrodes 13 and the gap between neighboring cathodic electrodes 13 are each 0.0010 cm. The anodic electrodes 12 are arrayed in 7 rows and 7 columns, and the number of anodic electrodes 12 is 49. The cathodic electrodes 13 are also arrayed in 7 rows and 7 columns, and the number of cathodic electrodes 13 is also 49. The outermost surface of the anodic electrodes 12 and the cathodic electrodes 13 is formed by an ITO layer.

In the state shown in FIG. 7A, one anodic electrode 12 located at the intersection of the third row and the second column is in the first state, while the other anodic electrodes 12 are in the second state. Meanwhile, nine cathodic electrodes 13 located at the intersections of the second row and the first to third columns, the intersections of the third row and the first to third columns, and the intersections of the fourth row and the first to third columns are in the fourth state, while the other cathodic electrodes 13 are in the third state.

In the state shown in FIG. 7B, one anodic electrode 12 located at the intersection of the third row and the third column is in the first state, while the other anodic electrodes 12 are in the second state. Meanwhile, nine cathodic electrodes 13 located at the intersections of the second row and the second to fourth columns, the intersections of the third row and the second to fourth columns, and the intersections of the fourth row and the second to fourth columns are in the fourth state, while the other cathodic electrodes 13 are in the third state.

In each of the state shown in FIG. 7A and the state shown in FIG. 7B, the minimum distance between the anodic electrode 12 that functions as the anode and the cathodic electrodes 13 that function as the cathodes (hereinafter, also referred to as "anode-cathode distance") is 0.1920 cm, and the total area of the anodic electrode 12 that functions as the anode and the cathodic electrodes 13 that function as the cathodes (hereinafter, also referred to as "total anode cathode area") is 0.7045 $cm^2$. Thus, since all of the previously-described conditions [1] to [5] are satisfied, presentation of tactile sensations can be suitably performed.

Note that the control by the control section 20 is not limited to examples where a single anodic electrode 12 is in the first state, such as those described with reference to FIG. 7A and FIG. 7B. Two of more anodic electrodes 12 may be in the first state.

Figure 8A:
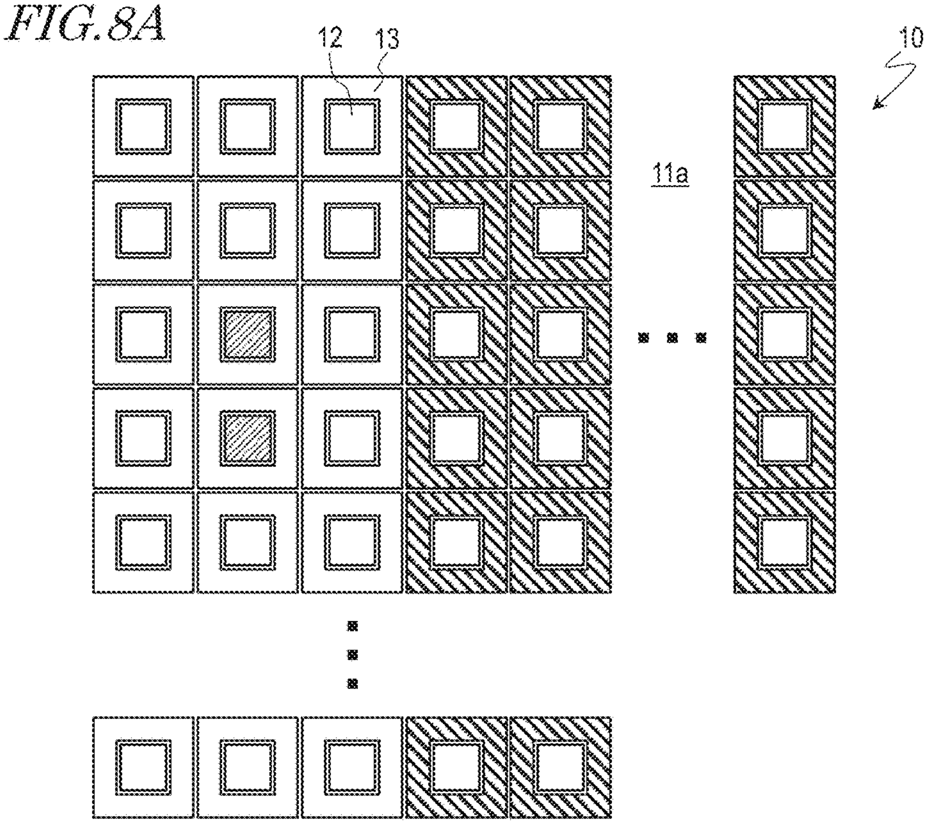
FIG. 8A shows the state (supplied potentials) of the anodic electrodes 12 and the cathodic electrodes 13 while the tactile sensation presenting section 10 presents a tactile sensation.
Figure 8B:
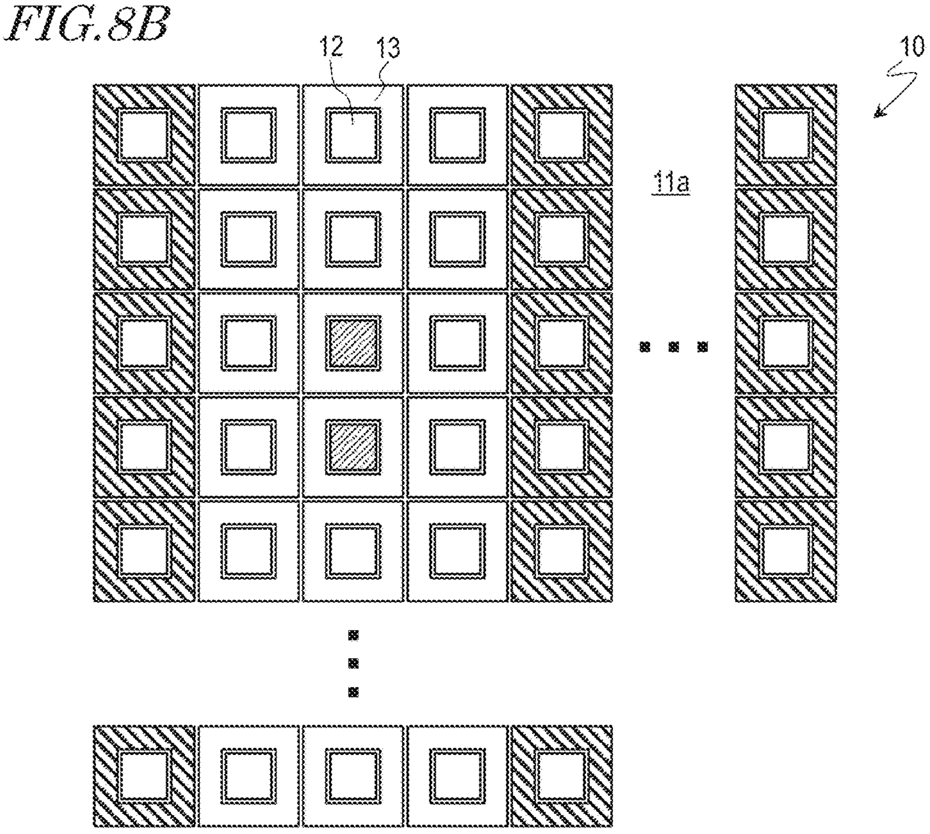
FIG. 8B shows the state (supplied potentials) of the anodic electrodes 12 and the cathodic electrodes 13 while the tactile sensation presenting section 10 presents a tactile sensation.

Another example of the control performed by the control section 20 when the tactile sensation presenting section 10 presents tactile sensations is described with reference to FIG. 8A and FIG. 8B. FIG. 8A and FIG. 8B show the state (supplied potentials) of the anodic electrodes 12 and the cathodic electrodes 13 of the tactile sensation presenting section 10. FIG. 8A illustrates a case where a tactile sensation is presented at a portion of the tactile sensation presenting section 10 corresponding to the anodic electrodes 12 located at the intersection of the third row and the second column and the intersection of the fourth row and the second column in the shown matrix. FIG. 8B illustrates a case where a tactile sensation is presented at a portion of the tactile sensation presenting section 10 corresponding to the anodic electrodes 12 located at the intersection of the third row and the third column and the intersection of the fourth row and the third column in the shown matrix. In FIG. 8A and FIG. 8B, the first-state anodic electrodes 12 (i.e., the anodic electrodes 12 supplied with the anodic potential) are hatched with diagonal lines descending to the left, and the third-state cathodic electrodes 13 (i.e., the cathodic electrodes 13 supplied with the cathodic potential) are hatched with diagonal lines descending to the right.

In this example, the area of each of the tactile sensation presenting sections 10 is 2.247 $cm^2$ (the transverse dimension (width w1) and the longitudinal dimension (width w2) are each 1.499 cm). The anodic electrodes 12 have the length of 0.058 cm on each side, the area of 0.0034 $cm^2$, and the array pitch of 0.1500 cm. The cathodic electrodes 13 have the length of 0.1490 cm on each side of the periphery, the area of 0.0186 $cm^2$, and the array pitch of 0.1500 cm. The gap between the anodic electrodes 12 and the cathodic electrodes 13 and the gap between neighboring cathodic electrodes 13 are each 0.0010 cm. The anodic electrodes 12 are arrayed in 10 rows and 10 columns, and the number of anodic electrodes 12 is 100. The cathodic electrodes 13 are also arrayed in 10 rows and 10 columns, and the number of cathodic electrodes 13 is also 100. The outermost surface of the anodic electrodes 12 and the cathodic electrodes 13 is formed by an ITO layer.

In the state shown in FIG. 8A, two anodic electrodes 12 located at the intersection of the third row and the second column and the intersection of the fourth row and the second column are in the first state, while the other anodic electrodes 12 are in the second state. Meanwhile, 30 cathodic electrodes 13 located in the first to third columns are in the fourth state, while the other cathodic electrodes 13 are in the third state. That is, the cathodic electrodes 13 belonging to the same column as that to which the first-state anodic electrodes 12 belong and the cathodic electrodes 13 belonging to neighboring columns on opposite sides of that column are all in the fourth state.

In the state shown in FIG. 8B, two anodic electrodes 12 located at the intersection of the third row and the third column and the intersection of the fourth row and the third column are in the first state, while the other anodic electrodes 12 are in the second state. Meanwhile, 30 cathodic electrodes 13 located in the second to fourth columns are in the fourth state, while the other cathodic electrodes 13 are in the third state. That is, the cathodic electrodes 13 belonging to the same column as that to which the first-state anodic electrodes 12 belong and the cathodic electrodes 13 belonging to neighboring columns on opposite sides of that column are all in the fourth state.

In each of the state shown in FIG. 8A and the state shown in FIG. 8B, the minimum distance between the anodic electrodes 12 that function as the anodes and the cathodic electrodes 13 that function as the cathodes (hereinafter, also referred to as "anode-cathode distance") is 0.1965 cm, and the total area of the anodic electrodes 12 that function as the anodes and the cathodic electrodes 13 that function as the cathodes (hereinafter, also referred to as "total anode cathode area") is 1.3088 $cm^2$. Thus, since all of the previously-described conditions [1] to [5] are satisfied, presentation of tactile sensations can be suitably performed.

In the tactile sensation presenting device 100 of the present embodiment, as previously described, the anodic electrodes 12 are switched between the first state and the second state, and the cathodic electrodes 13 are switched between the third state and the fourth state. On the other hand, in a tactile sensation presenting device disclosed in Japanese Laid-Open Patent Publication No. 2006-251948, each electrode is switched between the state of being coupled with the power supply and the state of being coupled with GND. In such a configuration that each electrode is switched between the state where the electrode functions as an anode and the state where the electrode functions as a cathode, such as the tactile sensation presenting device of Japanese Laid-Open Patent Publication No. 2006-251948, both circuitry and driving are complicated, leading to increase in size of the tactile sensation presenting section and manufacturing cost, and thus there is a probability that the mass productivity will decrease. In the present embodiment, electrodes that can function as anodes (anodic electrodes 12) and electrodes that can function as cathodes (cathodic electrodes 13) are separately provided, so that circuitry and driving can be relatively simple, and the mass productivity can improve.

[Results of Verification as to Anode-Cathode Distance and Total Anode Cathode Area]

Now, the results of verification as to the anode-cathode distance and the total anode cathode area are described.

Figure 9:
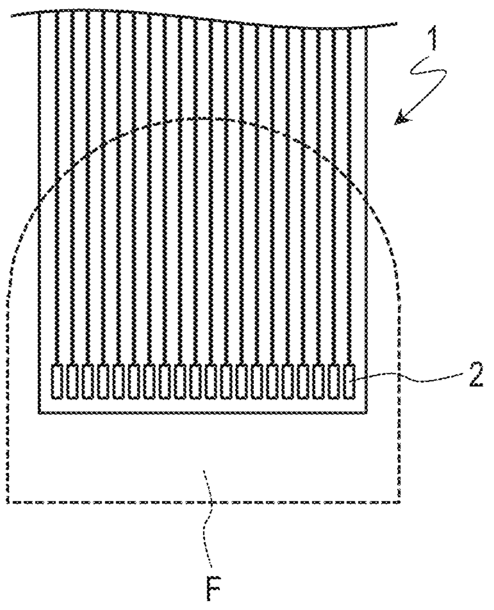
FIG. 9 shows a FPC (Flexible Printed Circuit) board 1 used in verification as to the anode-cathode distance and the total anode cathode area.

The verification was conducted using a FPC (Flexible Printed Circuit) board 1 that includes 20 pins 2 aligned in a single direction as shown in FIG. 9. Some of 20 pins 2 which are to function as anodes are supplied with a predetermined square wave, while others of the pins 2 which are to function as cathodes are coupled with GND.

In the verification as to the anode-cathode distance, the used square wave had the high level voltage at 40 Vrms, the low level voltage at 0 Vrms, and the duty ratio of 50%. TABLE 1 shows seven voltage application patterns (#1 to #7) used in the verification as to the anode-cathode distance. In TABLE 1, 20 pins 2 in FIG. 9 are sequentially numbered from the left end. The pins 2 which function as the anodes are labeled "A", and the pins 2 which function as the cathodes are labeled "C".

TABLE 1

| | Pin Number | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| #1 | A | A | | | | | | | | | | | C | C | C | C | C | C | | |
| #2 | A | A | | | | | | | | | C | C | C | C | C | C | | | | |
| #3 | A | A | | | | | | | C | C | C | C | C | C | | | | | | |
| #4 | A | A | | | | | C | C | C | C | C | C | | | | | | | | |
| #5 | A | A | | | C | C | C | C | C | C | | | | | | | | | | |
| #6 | A | A | | C | C | C | C | C | C | | | | | | | | | | | |
| #7 | A | A | C | C | C | C | C | C | | | | | | | | | | | | |

Figure 10:
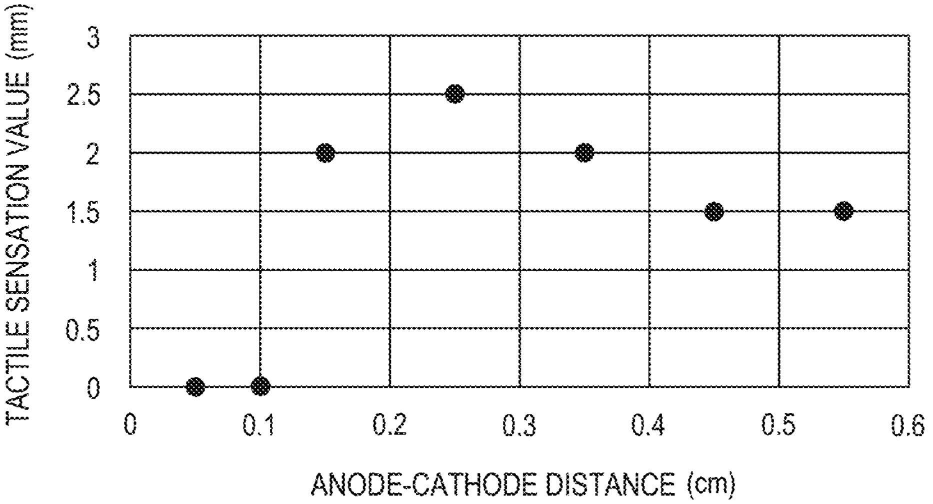
FIG. 10 is a graph showing the relationship between the anode-cathode distance (cm) and the tactile sensation value (mm).

TABLE 2 shows the results of verification as to the anode-cathode distance, specifically, the anode-cathode distance (cm) and the resultant tactile sensation value (mm) for seven patterns #1 to #7. Herein, the tactile sensation value is a sensation value obtained by subjective evaluation by human test subjects, specifically, a value recorded based on subjective evaluation of the degree of physical projection sensed when electrical stimulation was applied to fingertips. FIG. 10 shows the relationship between the anode-cathode distance (cm) and the tactile sensation value (mm).

TABLE 2

| | Settings | | | | | | | |
|---|---|---|---|---|---|---|---|---|
| | Cathode area (Number) | Total anode cathode area ($cm^2$) | Anode-cathode distance (Number) | Anode-cathode distance (cm) | Frequency (Hz) | Voltage (Vrms) | Measurements Current (μA) | Tactile sensation value (mm) |
| #1 | 6 | 0.4 | 10 | 0.55 | 200 | 40 | 176 | 1.5 |
| #2 | 6 | 0.4 | 8 | 0.45 | 200 | 40 | 221 | 1.5 |
| #3 | 6 | 0.4 | 6 | 0.35 | 200 | 40 | 235 | 2.0 |
| #4 | 6 | 0.4 | 4 | 0.25 | 200 | 40 | 570 | 2.5 |
| #5 | 6 | 0.4 | 2 | 0.15 | 200 | 40 | 600 | 2.0 |
| #6 | 6 | 0.4 | 1 | 0.1 | 200 | 40 | — | 0 |
| #7 | 6 | 0.4 | 0 | 0.05 | 200 | 40 | — | 0 |

As understood from TABLE 2 and FIG. 10, from the viewpoint of suitably obtaining a tactile sensation value, it is preferred that the anode-cathode distance is greater than 0.1 cm (i.e., 1 mm). Also, as understood from TABLE 2 and FIG. 10, from the viewpoint of obtaining a greater tactile sensation value, the anode-cathode distance is more preferably equal to or greater than 0.15 cm (i.e., 1.5 mm) and equal to or smaller than 0.35 cm (i.e., 3.5 mm), and is most preferably about 0.25 cm (i.e., about 2.5 mm).

In the verification as to the total anode cathode area, the used square wave had the high level voltage at an arbitrary level, the low level voltage at 0 Vrms, and the duty ratio of 50%. TABLE 3 shows seven voltage application patterns (#8 to #14) used in the verification as to the total anode cathode area.

TABLE 3

| | Pin Number | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| #8 | A | A | | | | | | | C | C | C | C | C | C | | | | | | |
| #9 | A | A | | | | | | | C | C | C | C | C | C | C | C | | | | |
| #10 | A | A | | | | | | | C | C | C | C | C | C | C | C | | | | |
| #11 | A | A | | | | | | | C | C | C | C | C | C | C | C | C | C | | |
| #12 | A | A | | | | | | | C | C | C | C | C | C | C | C | C | C | | |
| #13 | A | A | | | | | | | C | C | C | C | C | C | C | C | C | C | C | C |
| #14 | A | A | | | | | | | C | C | C | C | C | C | C | C | C | C | C | C |

Figure 11:
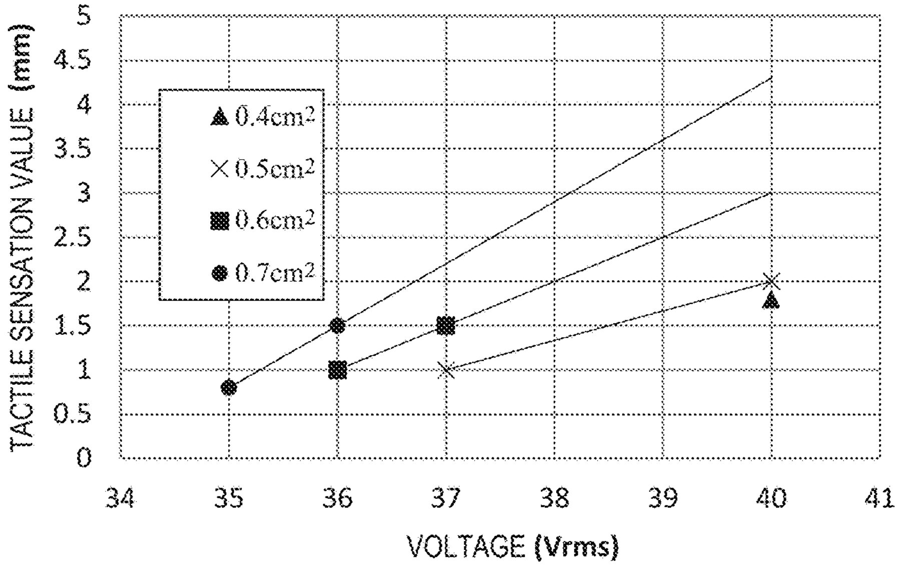
FIG. 11 is a graph showing the relationship between the voltage (Vrms) and the tactile sensation value (mm).

TABLE 4 shows the results of verification as to the total anode cathode area, specifically, the total anode cathode area ($cm^2$) and the resultant tactile sensation value (mm) for seven patterns #8 to #14. FIG. 11 shows the relationship between the voltage (Vrms) and the tactile sensation value (mm).

TABLE 4

| | Settings | | | | | | | |
|---|---|---|---|---|---|---|---|---|
| | Cathode area (Number) | Total anode cathode area ($cm^2$) | Anode-cathode distance (Number) | Anode-cathode distance (cm) | Frequency (Hz) | Voltage (Vrms) | Measurements Current (μA) | Tactile sensation value (mm) |
| #8 | 6 | 0.4 | 6 | 0.35 | 200 | 40 | 250 | 1.8 |
| #9 | 8 | 0.5 | 6 | 0.35 | 200 | 40 | 200 | 2 |
| #10 | 8 | 0.5 | 6 | 0.35 | 200 | 37 | 250 | 1 |
| #11 | 10 | 0.6 | 6 | 0.35 | 200 | 37 | 260 | 1.5 |
| #12 | 10 | 0.6 | 6 | 0.35 | 200 | 36 | 190 | 1 |
| #13 | 12 | 0.7 | 6 | 0.35 | 200 | 36 | 213 | 1.5 |
| #14 | 12 | 0.7 | 6 | 0.35 | 200 | 35 | 190 | 0.8 |

From the viewpoint of safety, it is preferred that the voltage applied between the anodes and cathodes is equal to or lower than 35 Vrms. From the viewpoint of presenting sufficient tactile sensations, it is preferred that the tactile sensation value is equal to or greater than 0.8 mm. As understood from TABLE 4 and FIG. 11, to obtain a tactile sensation value of 0.8 mm or greater with the voltage at 35 Vrms or lower, it is preferred that the total anode cathode area is equal to or greater than 0.7 $cm^2$.

As understood from these verification results, by satisfying the above-described conditions [1] to [5], presentation of tactile sensations can be suitably performed.

COMPARATIVE EXAMPLES

Hereinafter, tactile sensation presenting devices of Comparative Examples are described.

Figure 12:
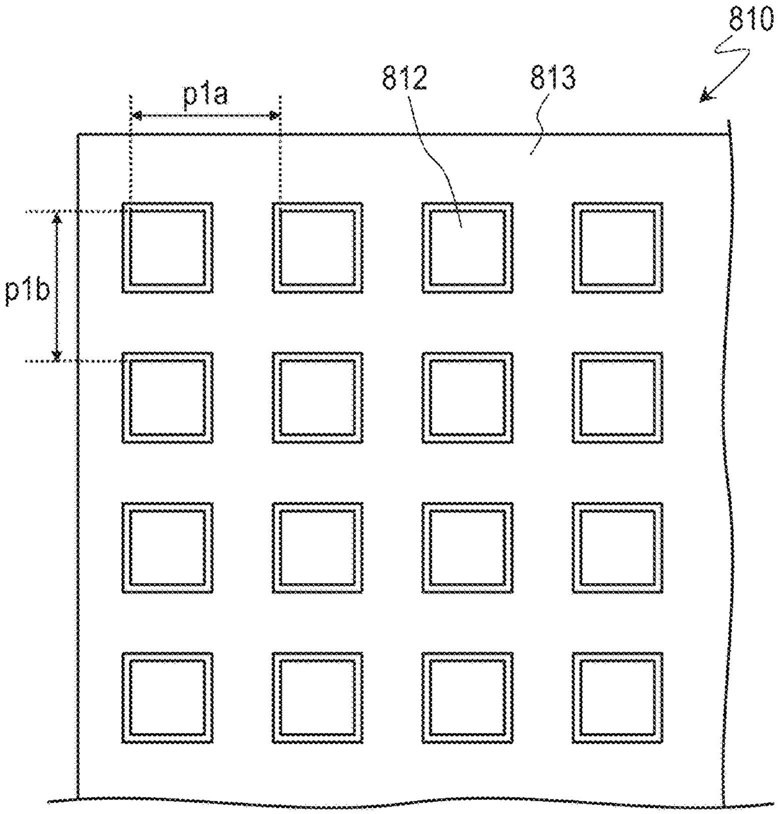
FIG. 12 is a plan view showing a tactile sensation presenting section 810 of a tactile sensation presenting device of Comparative Example 1.
Figure 13:
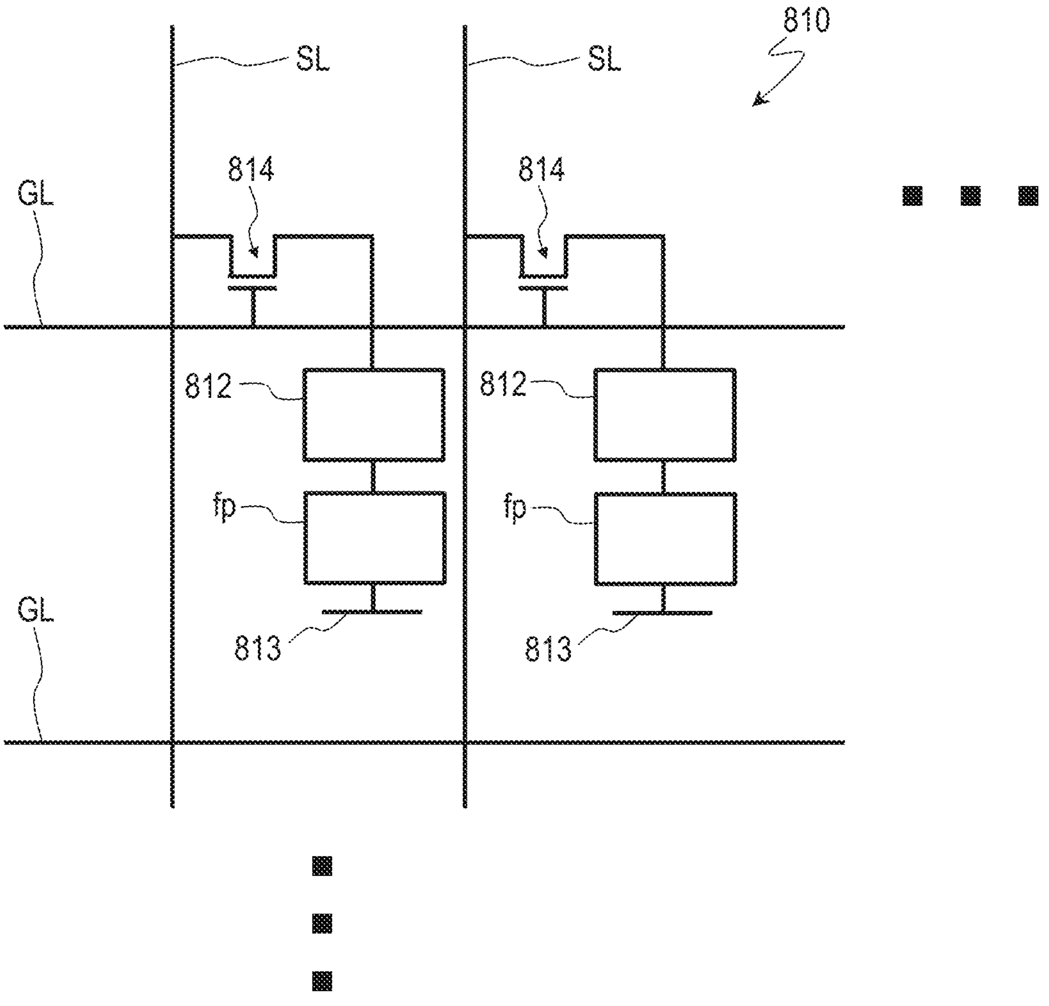
FIG. 13 shows the equivalent circuit of the tactile sensation presenting section 810.

First, the configuration of a tactile sensation presenting section 810 of a tactile sensation presenting device of Comparative Example 1 is described with reference to FIG. 12 and FIG. 13. FIG. 12 is a plan view showing the tactile sensation presenting section 810. FIG. 13 shows the equivalent circuit of the tactile sensation presenting section 810.

The area of the tactile sensation presenting section 810 is 1 $cm^2$ (the transverse and longitudinal dimensions are each 1 cm). The tactile sensation presenting section 810 includes a plurality of anodic electrodes 812 arrayed in a matrix and a single cathode (common cathode) 813. Each of the anodic electrodes 812 has a square shape, and the common cathode 813 has such a shape that surrounds all of the anodic electrodes 812.

The tactile sensation presenting section 810 further includes a plurality of gate lines GL, a plurality of source lines SL, and a plurality of TFTs 814. Each of the plurality of TFTs 814 is provided for a corresponding one of the plurality of anodic electrodes 812. The gate electrode and the source electrode of each of the TFTs 814 are electrically coupled with a corresponding one of the gate lines GL and a corresponding one of the source lines SL, respectively.

The anodic electrodes 812 are supplied with a predetermined anodic potential (power supply potential) from the source lines SL via the TFTs 814. The common cathode 813 is always electrically coupled with GND (i.e., always supplied with the cathodic potential).

There are 36 anodic electrodes 812 arrayed in 6 rows and 6 columns and surrounded by the common cathode 813.

Each of the anodic electrodes 812 has the length of 0.08 cm on each side, the area of 0.0064 $cm^2$, and the array pitches p1*a*, p1*b* of 0.15 cm. The gap between the anodic electrodes 812 and the common cathode 813 is 0.001 cm.

Figure 14A:
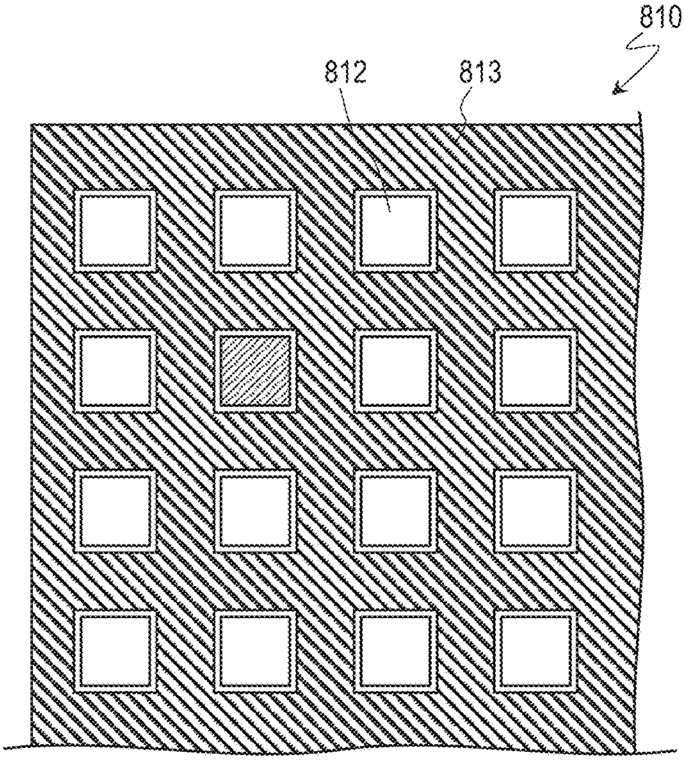
FIG. 14A shows the state (supplied potentials) of anodic electrodes 812 and a common cathode 813 while the tactile sensation presenting section 810 presents a tactile sensation.
Figure 14B:
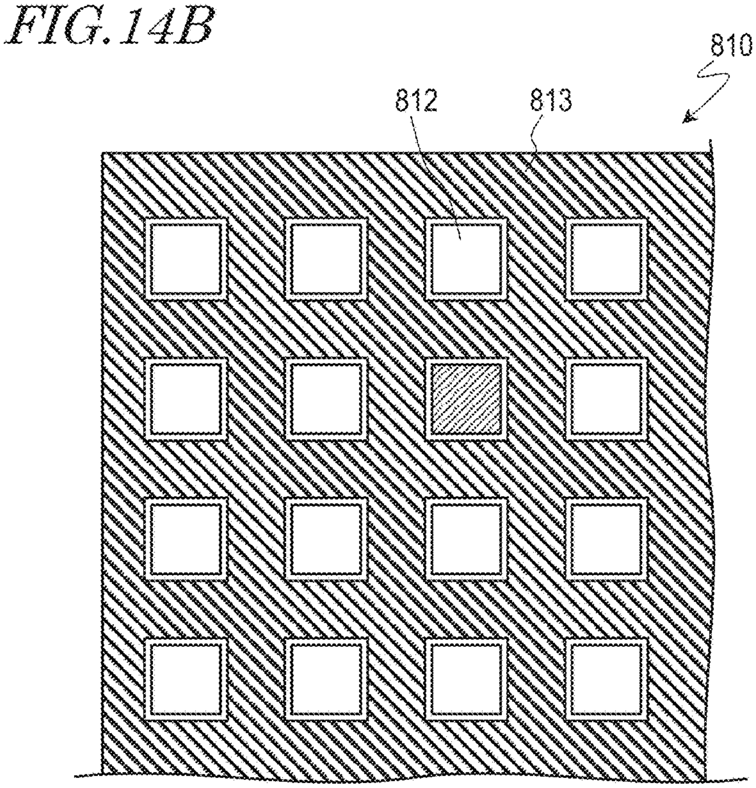
FIG. 14B shows the state (supplied potentials) of the anodic electrodes 812 and the common cathode 813 while the tactile sensation presenting section 810 presents a tactile sensation.

An example of the control performed when the tactile sensation presenting section 810 presents tactile sensations is described with reference to FIG. 14A and FIG. 14B. FIG. 14A and FIG. 14B show the state (supplied potentials) of the anodic electrodes 812 and the common cathode 813 of the tactile sensation presenting section 810. FIG. 14A illustrates a case where a tactile sensation is presented at a portion of the tactile sensation presenting section 810 corresponding to the anodic electrode 812 located at the intersection of the second row and the second column in the shown matrix. FIG. 14B illustrates a case where a tactile sensation is presented at a portion of the tactile sensation presenting section 810 corresponding to the anodic electrode 812 located at the intersection of the second row and the third column in the shown matrix. In FIG. 14A and FIG. 14B, the anodic electrode 812 supplied with the anodic potential is hatched with diagonal lines descending to the left, and the common cathode 813 supplied with the cathodic potential is hatched with diagonal lines descending to the right.

In Comparative Example 1, the total anode cathode area is about 0.7643 $cm^2$ and hence greater than 0.7 $cm^2$, while the anode-cathode distance is 0.001 cm and hence smaller than 0.1 cm. Thus, even if the applied voltage is 40 Vrms, which is higher than 35 Vrms, tactile sensations cannot be perceived. This is probably because the anode-cathode distance is small, so that the electric current preferentially flows to the skin surface and fails to reach the receptors.

Figure 15:
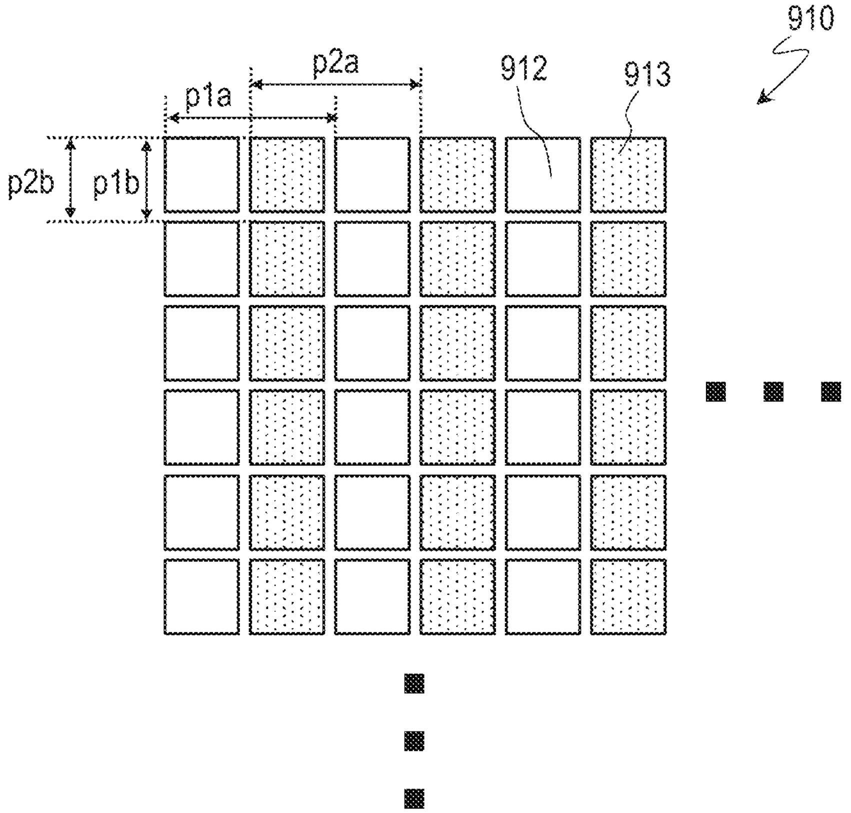
FIG. 15 is a plan view showing a tactile sensation presenting section 910 of a tactile sensation presenting device of Comparative Example 2.

Next, the configuration of a tactile sensation presenting section 910 of a tactile sensation presenting device of Comparative Example 2 is described with reference to FIG. 15. FIG. 15 is a plan view showing the tactile sensation presenting section 910. The equivalent circuit of the tactile sensation presenting section 910 can be the same as that shown in FIG. 6 and is therefore not shown herein.

The area of the tactile sensation presenting section 910 is 1.2 $cm^2$. The tactile sensation presenting section 910 includes a plurality of anodic electrodes 912 arrayed in a matrix and a plurality of cathodic electrodes 913 arrayed in a matrix. Each of the anodic electrodes 912 has a square shape, and each of the cathodic electrodes 913 also has a square shape. In the tactile sensation presenting section 910, the electrode columns of the anodic electrodes 912 and the electrode columns of the cathodic electrodes 913 are alternately provided.

The anodic electrodes 912 can be switched between the state of being supplied with the anodic potential and the state of being supplied with a floating potential. The cathodic electrodes 913 can be switched between the state of being supplied with the cathodic potential and the state of being supplied with a floating potential.

The anodic electrodes 912 have the length of 0.14 cm on each side, the area of 0.0196 $cm^2$, and the array pitches p1*a*, p1*b* of 0.30 cm and 0.15 cm, respectively. The cathodic electrodes 913 also have the length of 0.14 cm on each side, the area of 0.0196 $cm^2$, and the array pitches p2*a*, p2*b* of 0.30 cm and 0.15 cm, respectively. The gap between the anodic electrodes 912 and the cathodic electrodes 913, the gap between neighboring anodic electrodes 912, and the gap between neighboring cathodic electrodes 913 are each 0.001 cm.

Figure 16A:
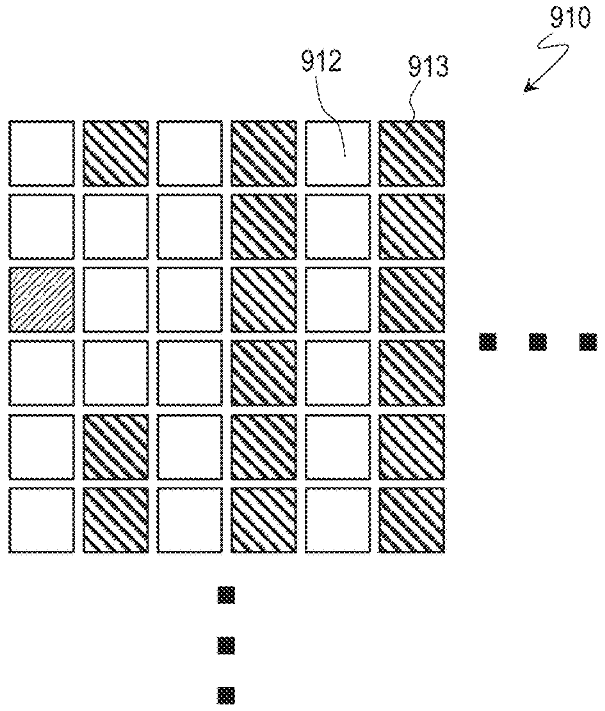
FIG. 16A shows the state (supplied potentials) of anodic electrodes 912 and cathodic electrodes 913 while the tactile sensation presenting section 910 presents a tactile sensation.
Figure 16B:
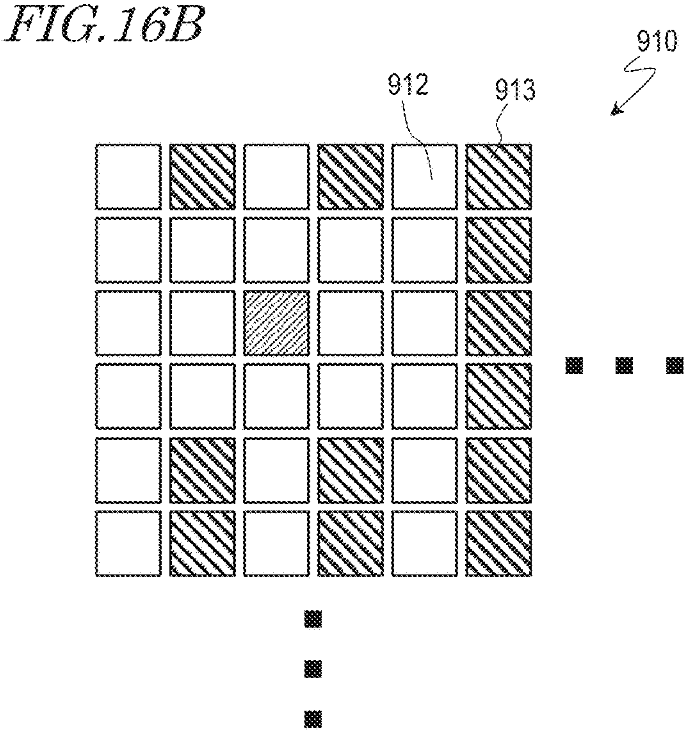
FIG. 16B shows the state (supplied potentials) of the anodic electrodes 912 and the cathodic electrodes 913 while the tactile sensation presenting section 910 presents a tactile sensation.

An example of the control performed when the tactile sensation presenting section 910 presents tactile sensations is described with reference to FIG. 16A and FIG. 16B. FIG. 16A and FIG. 16B show the state (supplied potentials) of the anodic electrodes 912 and the cathodic electrodes 913 of the tactile sensation presenting section 910. FIG. 16A illustrates a case where a tactile sensation is presented at a portion of the tactile sensation presenting section 910 corresponding to the anodic electrode 912 located at the intersection of the third row and the first column in the shown matrix. FIG. 16B illustrates a case where a tactile sensation is presented at a portion of the tactile sensation presenting section 910 corresponding to the anodic electrode 912 located at the intersection of the third row and the second column (if the anodic electrodes 912 and the cathodic electrodes 913 are not distinguished, the third row and the third column) in the shown matrix. In FIG. 16A and FIG. 16B, the anodic electrode 912 supplied with the anodic potential is hatched with diagonal lines descending to the left, and the cathodic electrodes 913 supplied with the cathodic potential are hatched with diagonal lines descending to the right.

In Comparative Example 2, the anode-cathode distance is greater than 0.1 cm, while the total anode cathode area is about 0.5292 $cm^2$ and hence smaller than 0.7 $cm^2$. Thus, tactile sensations cannot be perceived.

Embodiment 2

Figure 17:
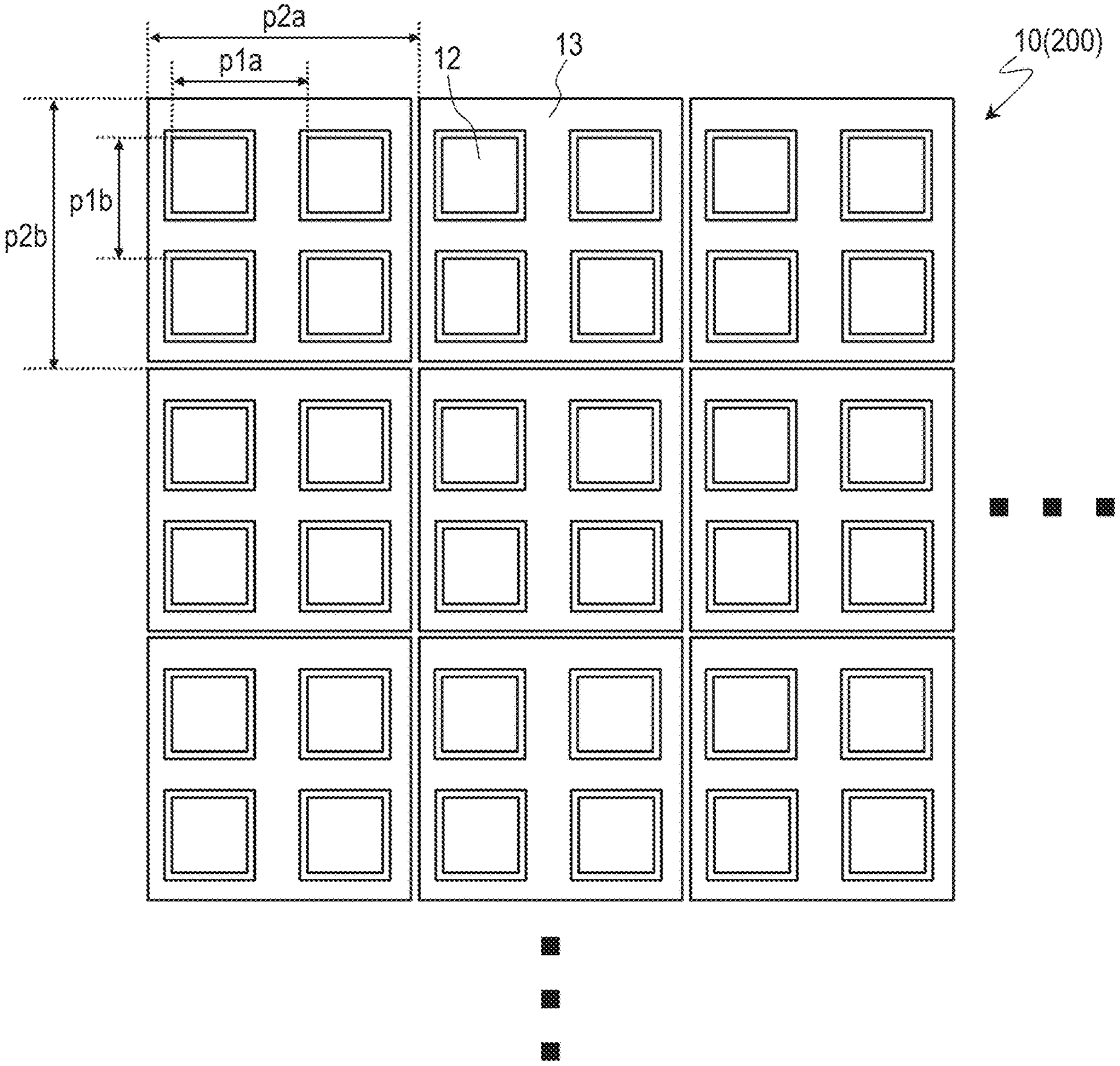
FIG. 17 is a plan view schematically showing a tactile sensation presenting section 10 of another tactile sensation presenting device 200 according to an embodiment of the present invention.

A tactile sensation presenting device 200 of the present embodiment is described with reference to FIG. 17. FIG. 17 is a plan view schematically showing a tactile sensation presenting section 10 of the tactile sensation presenting device 200. Hereinafter, the differences of the tactile sensation presenting device 200 of the present embodiment from the tactile sensation presenting device 100 of Embodiment 1 are mainly described. The block diagram, cross-sectional view and equivalent circuit of the tactile sensation presenting device 200 can be the same as those of the tactile sensation presenting device 100 of Embodiment 1 and are therefore not shown herein.

The tactile sensation presenting section 10 of the tactile sensation presenting device 200 includes a plurality of anodic electrodes 12 arrayed in a matrix and a plurality of cathodic electrodes 13 arrayed in a matrix. In the present embodiment, the array pitch of the plurality of cathodic electrodes 13 is greater than the array pitch of the plurality of anodic electrodes 12. Specifically, the array pitch p2*a* along the row direction of the cathodic electrodes 13 is greater than the array pitch p1*a* along the row direction of the anodic electrodes 12, and the array pitch p2*b* along the column direction of the cathodic electrodes 13 is greater than the array pitch p1*b* along the column direction of the anodic electrodes 12.

In the present embodiment, the number of cathodic electrodes 13 is smaller than (specifically, ¼ of) the number of anodic electrodes 12, and each of the cathodic electrodes 13 has such a shape that surrounds four anodic electrodes 12 as viewed in plan. Note that the number of anodic electrodes 12 surrounded by each of the cathodic electrodes 13 is not limited to four.

Also in the tactile sensation presenting device 200 of the present embodiment, the tactile sensation presenting section 10 is controlled by a control section (not shown) such that the previously-described conditions [1] to [5] are satisfied, whereby presentation of tactile sensations can be suitably performed.

Figure 18A:
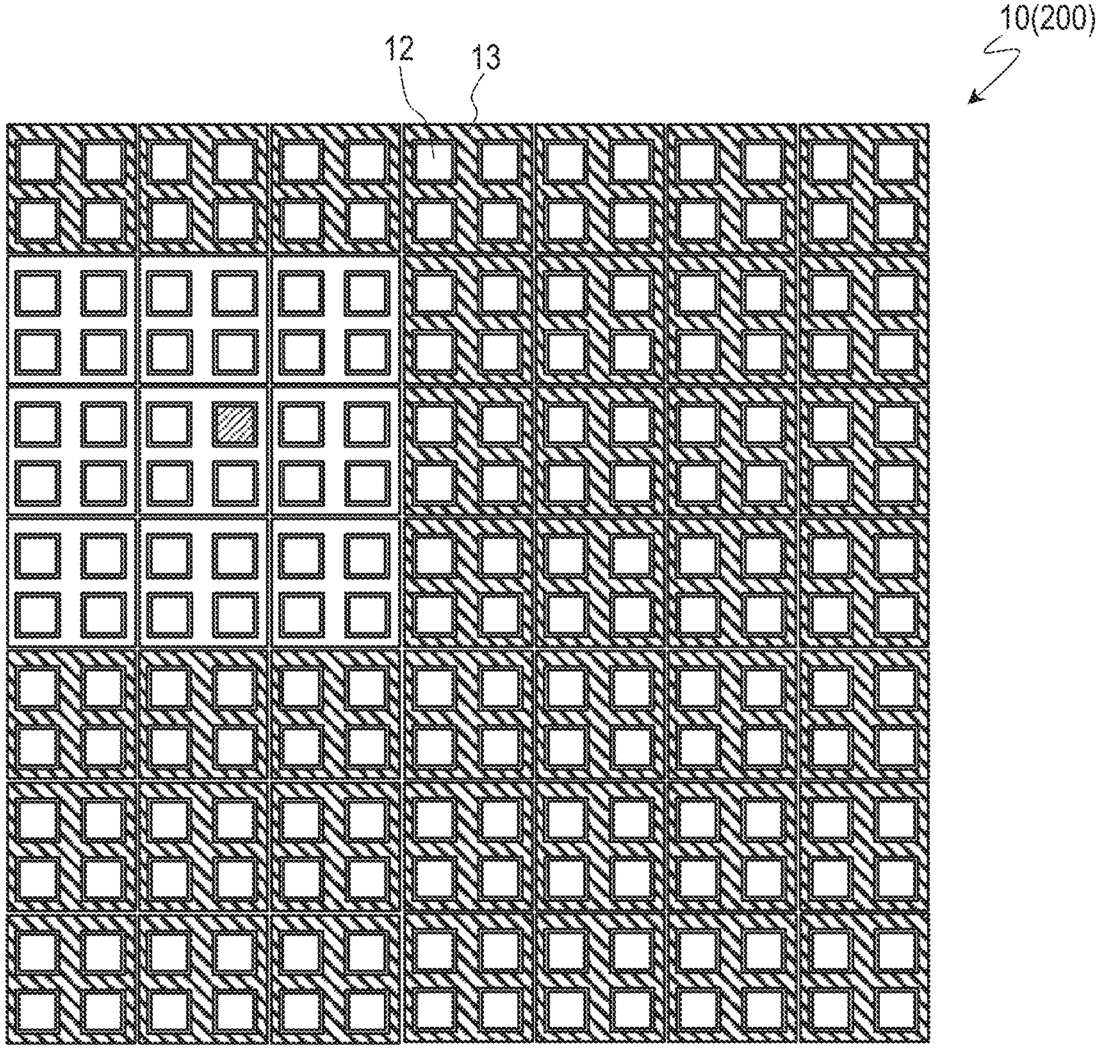
FIG. 18A shows the state (supplied potentials) of anodic electrodes 12 and cathodic electrodes 13 while the tactile sensation presenting section 10 of the tactile sensation presenting device 200 presents a tactile sensation.
Figure 18B:
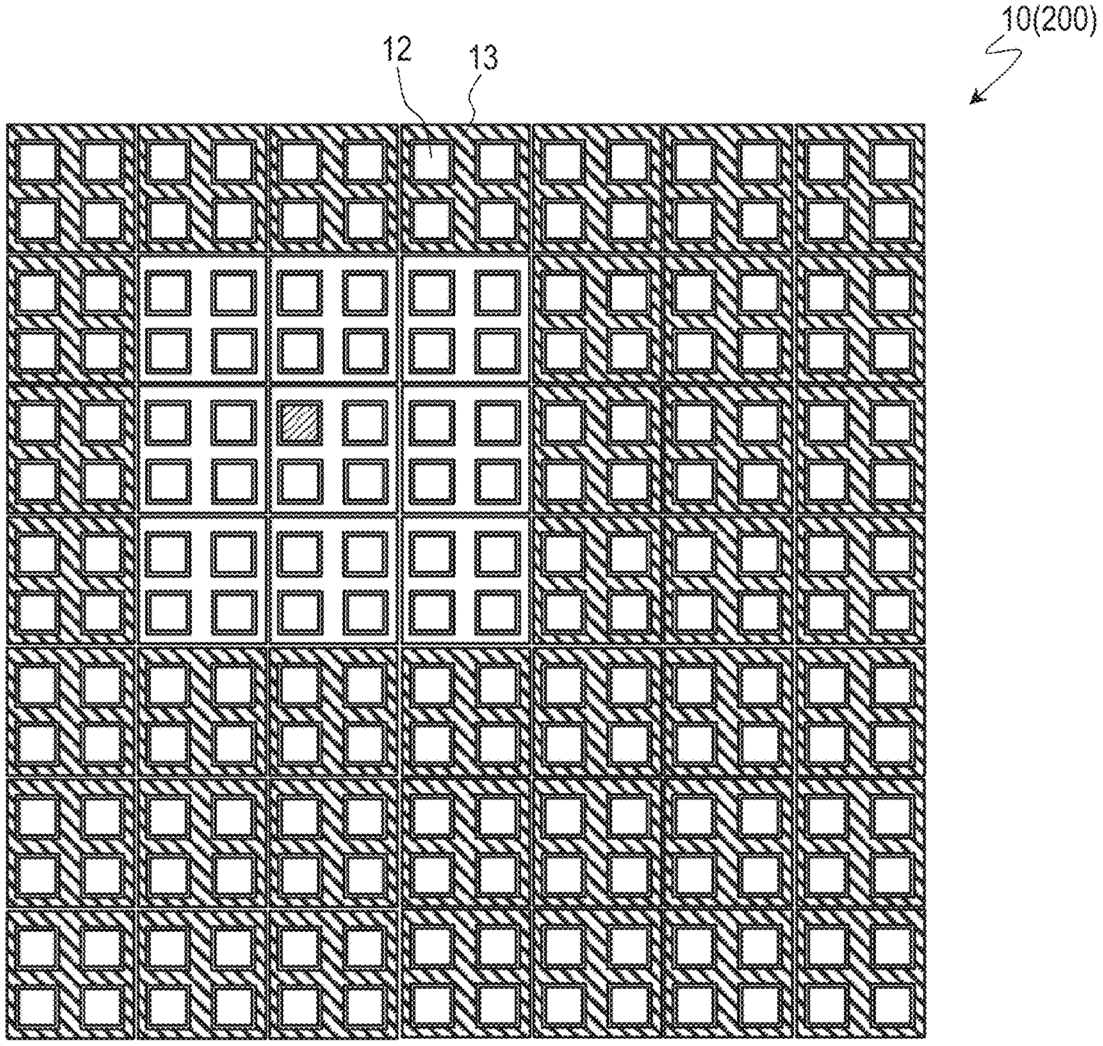
FIG. 18B shows the state (supplied potentials) of the anodic electrodes 12 and the cathodic electrodes 13 while the tactile sensation presenting section 10 of the tactile sensation presenting device 200 presents a tactile sensation.
Figure 18C:
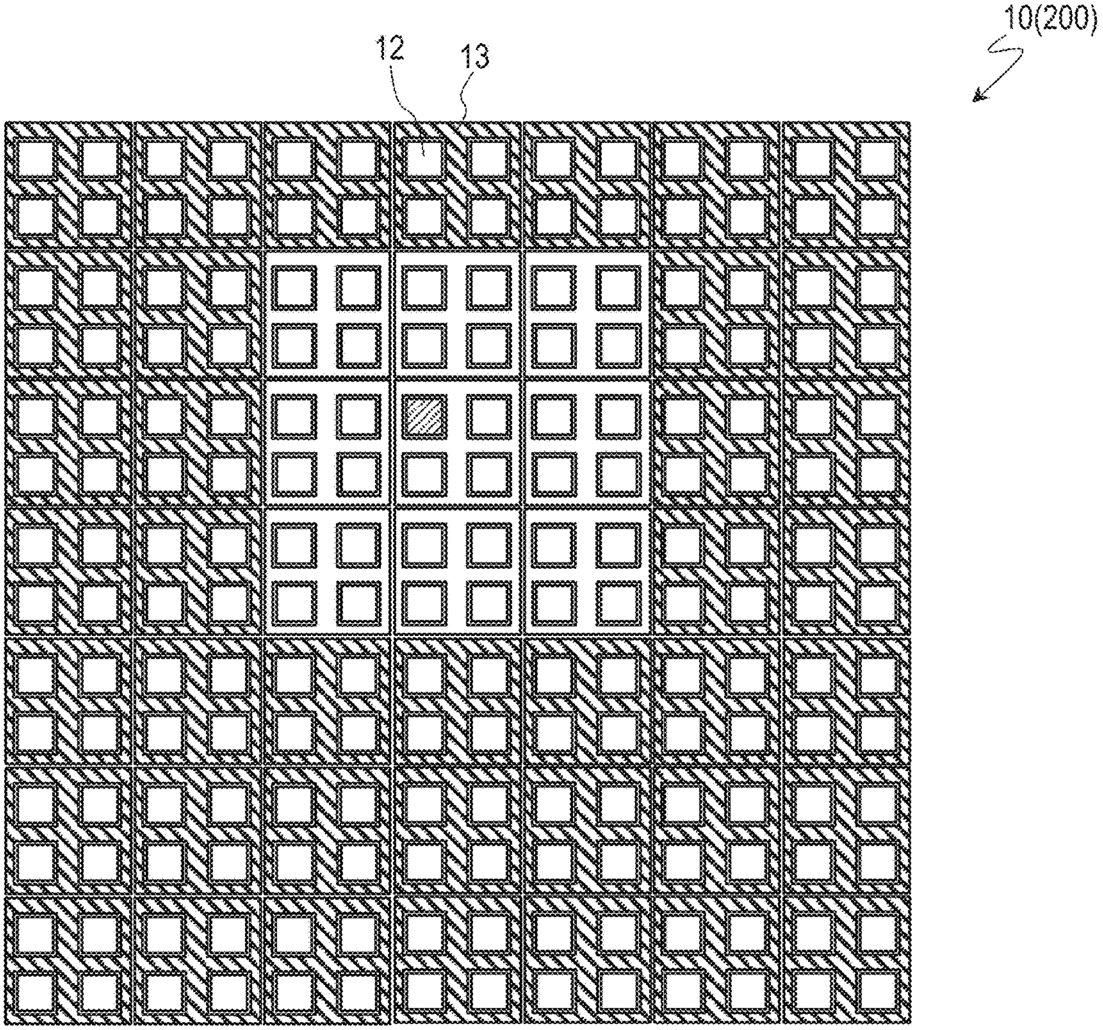
FIG. 18C shows the state (supplied potentials) of the anodic electrodes 12 and the cathodic electrodes 13 while the tactile sensation presenting section 10 of the tactile sensation presenting device 200 presents a tactile sensation.

Now, an example of the control performed when the tactile sensation presenting section 10 presents tactile sensations is described with reference to FIG. 18A, FIG. 18B and FIG. 18C. FIG. 18A, FIG. 18B and FIG. 18C show the state (supplied potentials) of the anodic electrodes 12 and the cathodic electrodes 13 of the tactile sensation presenting section 10. FIG. 18A illustrates a case where a tactile sensation is presented at a portion of the tactile sensation presenting section 10 corresponding to the anodic electrode 12 located at the intersection of the fifth row and the fourth column in the shown matrix. FIG. 18B illustrates a case where a tactile sensation is presented at a portion of the tactile sensation presenting section 10 corresponding to the anodic electrode 12 located at the intersection of the fifth row and the fifth column in the shown matrix. FIG. 18C illustrates a case where a tactile sensation is presented at a portion of the tactile sensation presenting section 10 corresponding to the anodic electrode 12 located at the intersection of the fifth row and the seventh column in the shown matrix. In FIG. 18A, FIG. 18B and FIG. 18C, the first-state anodic electrodes 12 (i.e., the anodic electrodes 12 supplied with the anodic potential) are hatched with diagonal lines descending to the left, and the third-state cathodic electrodes 13 (i.e., the cathodic electrodes 13 supplied with the cathodic potential) are hatched with diagonal lines descending to the right.

In this example, each of the tactile sensation presenting sections 10 has a square shape and has the area of 1.103 $cm^2$ (the transverse and longitudinal dimensions are each 1.050 cm). The anodic electrodes 12 have the length of 0.032 cm on each side, the area of 0.0010 $cm^2$, and the array pitch of 0.0750 cm. The cathodic electrodes 13 have the length of 0.149 cm on each side of the periphery, the area of 0.0176 $cm^2$, and the array pitch of 0.1500 cm. The anodic electrodes 12 are arrayed in 14 rows and 14 columns, and the number of anodic electrodes 12 is 196. The cathodic electrodes 13 are also arrayed in 7 rows and 7 columns, and the number of cathodic electrodes 13 is 49. The gap between the anodic electrodes 12 and the cathodic electrodes 13 and the gap between neighboring cathodic electrodes 13 are each 0.001 cm.

In the state shown in FIG. 18A, one anodic electrode 12 located at the intersection of the fifth row and the fourth column is in the first state, while the other anodic electrodes 12 are in the second state. Meanwhile, nine cathodic electrodes 13 located at the intersections of the second row and the first to third columns, the intersections of the third row and the first to third columns, and the intersections of the fourth row and the first to third columns are in the fourth state, while the other cathodic electrodes 13 are in the third state.

In the state shown in FIG. 18B, one anodic electrode 12 located at the intersection of the fifth row and the fifth column is in the first state, while the other anodic electrodes 12 are in the second state. Meanwhile, nine cathodic electrodes 13 located at the intersections of the second row and the second to fourth columns, the intersections of the third row and the second to fourth columns, and the intersections of the fourth row and the second to fourth columns are in the fourth state, while the other cathodic electrodes 13 are in the third state.

In the state shown in FIG. 18C, one anodic electrode 12 located at the intersection of the fifth row and the seventh column is in the first state, while the other anodic electrodes 12 are in the second state. Meanwhile, nine cathodic electrodes 13 located at the intersections of the second row and the third to fifth columns, the intersections of the third row and the third to fifth columns, and the intersections of the fourth row and the third to fifth columns are in the fourth state, while the other cathodic electrodes 13 are in the third state.

In each of the state shown in FIG. 18A, the state shown in FIG. 18B and the state shown in FIG. 18C, the anode-cathode distance is 0.1720 cm, and the total anode cathode area is 0.7050 $cm^2$. Thus, since all of the previously-described conditions [1] to [5] are satisfied, presentation of tactile sensations can be suitably performed.

In the present embodiment, the array pitch of the cathodic electrodes 13 is greater than the array pitch of the anodic electrodes 12, and the number of cathodic electrodes 13 is smaller than the number of anodic electrodes 12. Therefore, it is possible to reduce the number of cathodic electrodes 13 that are to be controlled while improving the resolution of tactile sensations that can be presented, so that circuitry and driving can be further simplified.

Embodiment 3

Figure 19:
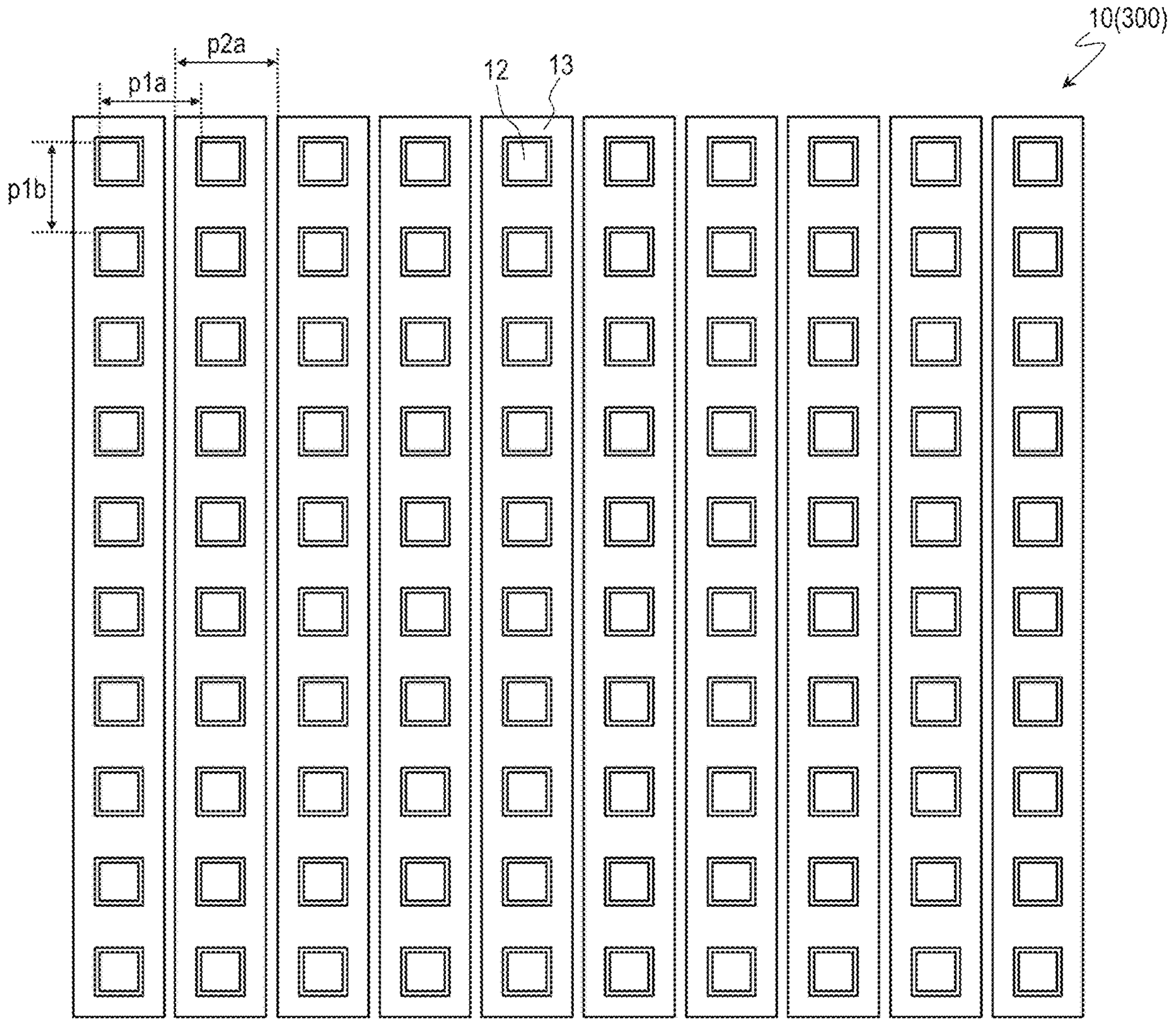
FIG. 19 is a plan view schematically showing a tactile sensation presenting section 10 of still another tactile sensation presenting device 300 according to an embodiment of the present invention.

A tactile sensation presenting device 300 of the present embodiment is described with reference to FIG. 19. FIG. 19 is a plan view schematically showing a tactile sensation presenting section 10 of the tactile sensation presenting device 300. Hereinafter, the differences of the tactile sensation presenting device 300 of the present embodiment from the tactile sensation presenting device 100 of Embodiment 1 are mainly described. The block diagram, cross-sectional view and equivalent circuit of the tactile sensation presenting device 300 can be the same as those of the tactile sensation presenting device 100 of Embodiment 1 and are therefore not shown herein.

In the tactile sensation presenting section 10 of the tactile sensation presenting device 300, a plurality of anodic electrodes 12 are arrayed in a matrix, while a plurality of cathodic electrodes 13 are arrayed in a single row and a plurality of columns (herein, 10 columns). The array pitch p2_a_ along the row direction of the cathodic electrodes 13 is equal to the array pitch p1_a_ along the row direction of the anodic electrodes 12. Since the plurality of cathodic electrodes 13 are arrayed in a single row and a plurality of columns, the array pitch along the column direction of the cathodic electrodes 13 is not defined.

In the present embodiment, the number of cathodic electrodes 13 is smaller than, specifically 1/10 of, the number of anodic electrodes 12. Each of the cathodic electrodes 13 has such a shape whose longitudinal direction is defined in the column direction (i.e., elongated in the column direction as a whole). It can also be said that each of the cathodic electrodes 13 has such a shape that surrounds 10 anodic electrodes 12 as viewed in plan.

Also in the tactile sensation presenting device 300 of the present embodiment, the tactile sensation presenting section 10 is controlled by a control section (not shown) such that the previously-described conditions [1] to [5] are satisfied, whereby presentation of tactile sensations can be suitably performed.

Figure 20A:
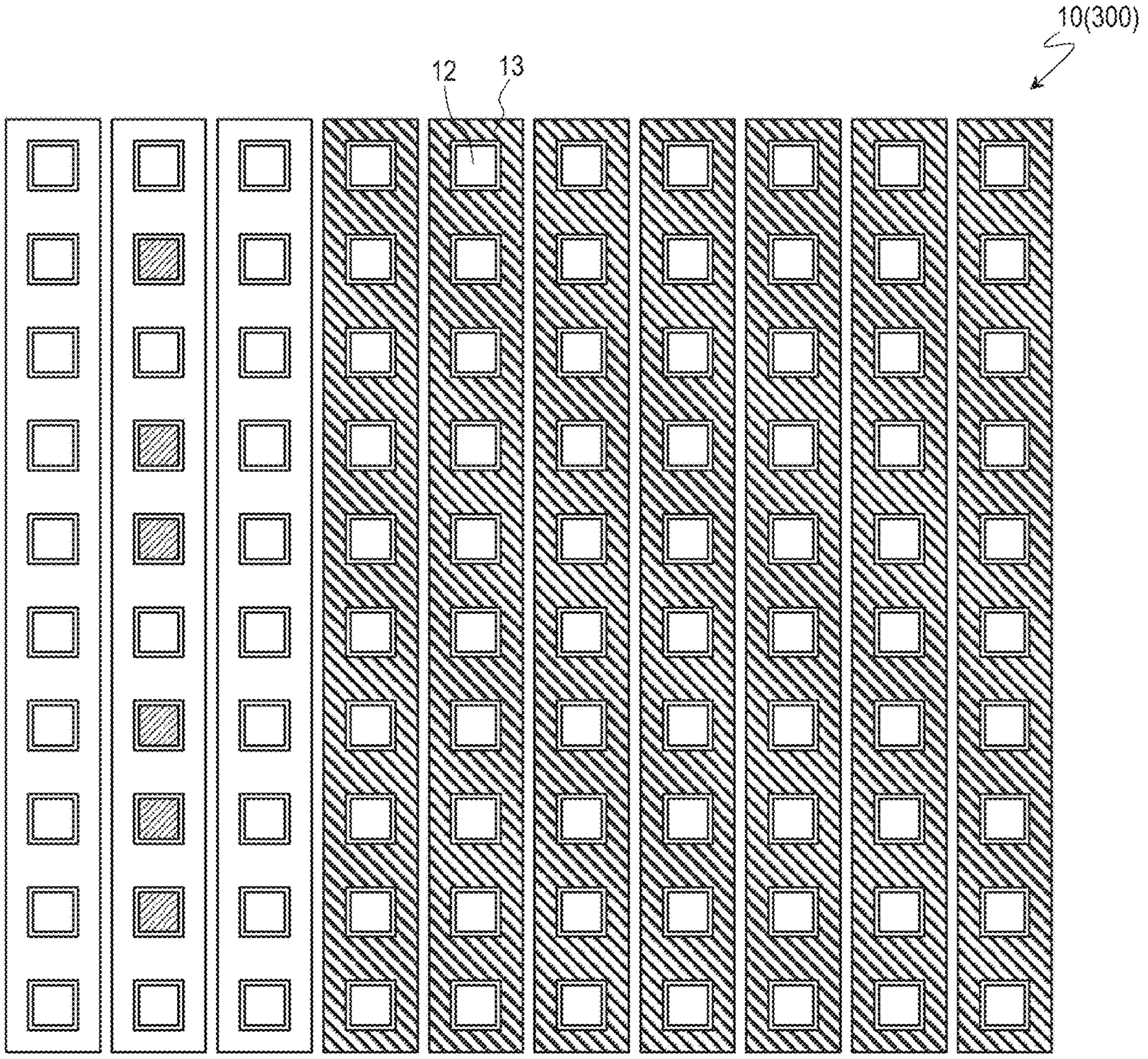
FIG. 20A shows the state (supplied potentials) of anodic electrodes 12 and cathodic electrodes 13 while the tactile sensation presenting section 10 of the tactile sensation presenting device 300 presents a tactile sensation.
Figure 20B:
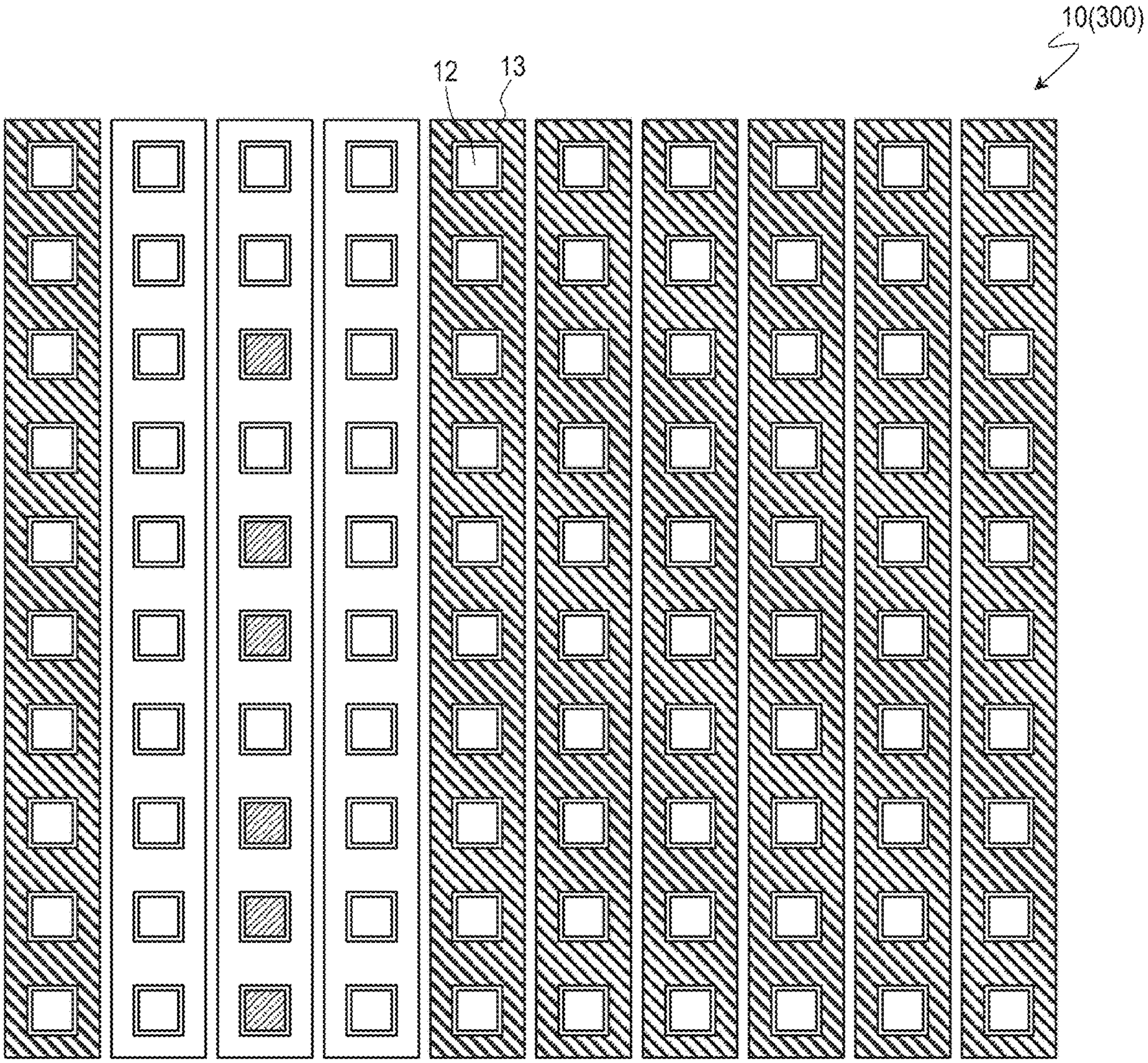
FIG. 20B shows the state (supplied potentials) of the anodic electrodes 12 and the cathodic electrodes 13 while the tactile sensation presenting section 10 of the tactile sensation presenting device 300 presents a tactile sensation.
Figure 20C:
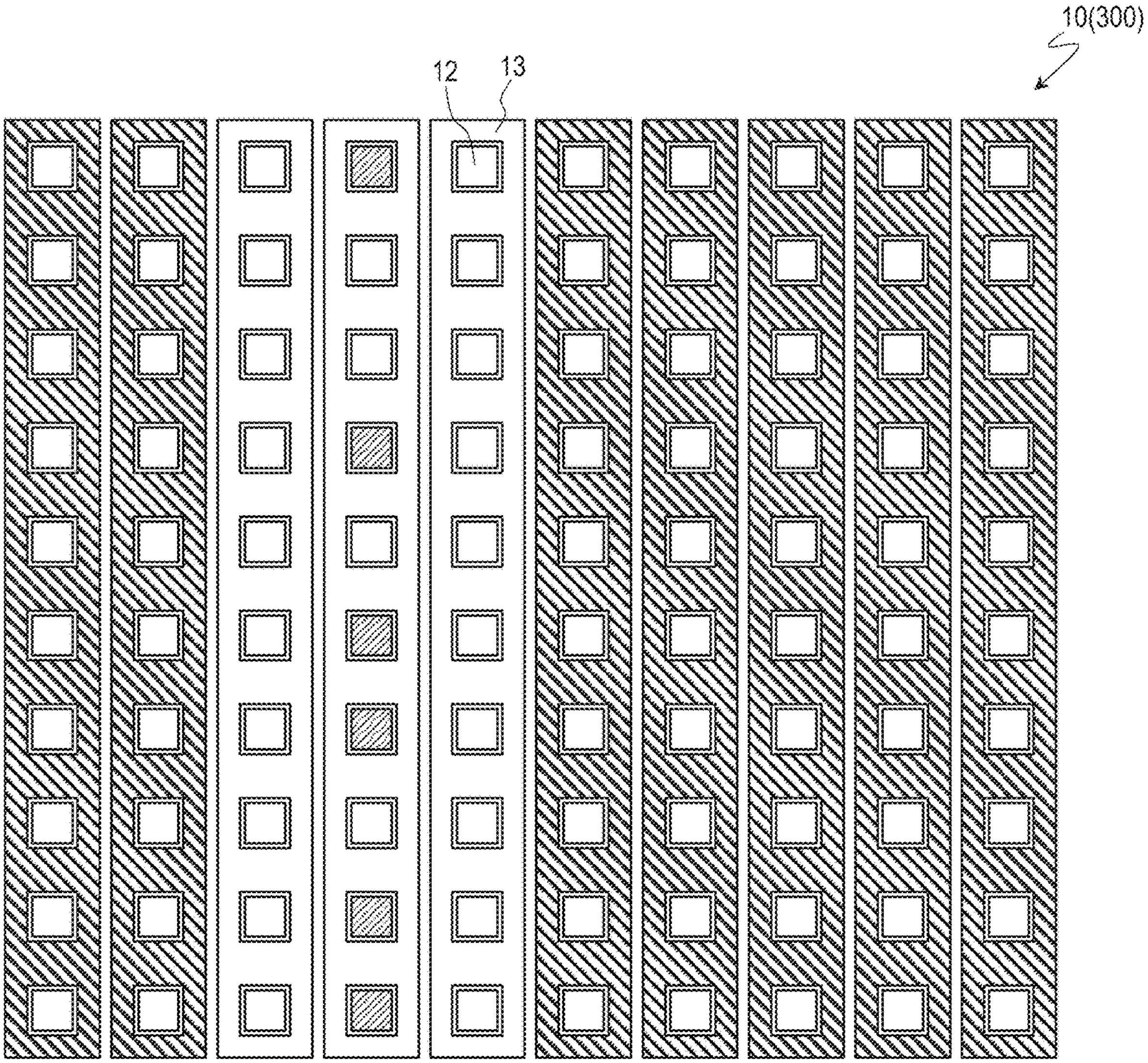
FIG. 20C shows the state (supplied potentials) of the anodic electrodes 12 and the cathodic electrodes 13 while the tactile sensation presenting section 10 of the tactile sensation presenting device 300 presents a tactile sensation.

Now, an example of the control performed when the tactile sensation presenting section 10 presents tactile sensations is described with reference to FIG. 20A, FIG. 20B and FIG. 20C. FIG. 20A, FIG. 20B and FIG. 20C show the state (supplied potentials) of the anodic electrodes 12 and the cathodic electrodes 13 of the tactile sensation presenting section 10. FIG. 20A illustrates a case where a tactile sensation is presented at portions of the tactile sensation presenting section 10 corresponding to the anodic electrodes 12 located at the intersection of the second row and the second column, the intersection of the fourth row and the second column, the intersection of the fifth row and the second column, the intersection of the seventh row and the second column, the intersection of the eighth row and the second column, and the intersection of the ninth row and the second column in the shown matrix. FIG. 20B illustrates a case where a tactile sensation is presented at portions of the tactile sensation presenting section 10 corresponding to the anodic electrodes 12 located at the intersection of the third row and the third column, the intersection of the fifth row and the third column, the intersection of the sixth row and the third column, the intersection of the eighth row and the third column, the intersection of the ninth row and the third column, and the intersection of the tenth row and the third column in the shown matrix. FIG. 20C illustrates a case where a tactile sensation is presented at portions of the tactile sensation presenting section 10 corresponding to the anodic electrodes 12 located at the intersection of the first row and the fourth column, the intersection of the fourth row and the fourth column, the intersection of the sixth row and the fourth column, the intersection of the seventh row and the fourth column, the intersection of the ninth row and the fourth column, and the intersection of the tenth row and the fourth column in the shown matrix. In FIG. 20A, FIG. 20B and FIG. 20C, the first-state anodic electrodes 12 (i.e., the anodic electrodes 12 supplied with the anodic potential) are hatched with diagonal lines descending to the left, and the third-state cathodic electrodes 13 (i.e., the cathodic electrodes 13 supplied with the cathodic potential) are hatched with diagonal lines descending to the right.

In this example, each of the tactile sensation presenting sections 10 has a square shape and has the area of 2.235 $cm^2$ (the transverse dimension is 1.490 cm and the longitudinal dimension is 1.500 cm). The anodic electrodes 12 have the length of 0.050 cm on each side, the area of 0.0025 $cm^2$, and the array pitch of 0.1500 cm. The cathodic electrodes 13 have the length of 0.140 cm along the row direction, the length of 1.500 cm along the column direction, the area of 0.1610 $cm^2$, and the array pitch of 0.1500 cm along the row direction. The anodic electrodes 12 are arrayed in 10 rows and 10 columns, and the number of anodic electrodes 12 is 100. The cathodic electrodes 13 are also arrayed in a single row and 10 columns, and the number of cathodic electrodes 13 is 10. The gap between the anodic electrodes 12 and the cathodic electrodes 13 and the gap between neighboring cathodic electrodes 13 are each 0.01 cm.

In the state shown in FIG. 20A, six anodic electrodes 12 located at the intersection of the second row and the second column, the intersection of the fourth row and the second column, the intersection of the fifth row and the second column, the intersection of the seventh row and the second column, the intersection of the eighth row and the second column, and the intersection of the ninth row and the second column are in the first state, while the other anodic electrodes 12 are in the second state. Meanwhile, three cathodic electrodes 13 located in the first to third columns are in the fourth state, while the other cathodic electrodes 13 are in the third state.

In the state shown in FIG. 20B, six anodic electrodes 12 located at the intersection of the third row and the third column, the intersection of the fifth row and the third column, the intersection of the sixth row and the third column, the intersection of the eighth row and the third column, the intersection of the ninth row and the third column, and the intersection of the tenth row and the third column are in the first state, while the other anodic electrodes 12 are in the second state. Meanwhile, three cathodic electrodes 13 located in the second to fourth columns are in the fourth state, while the other cathodic electrodes 13 are in the third state.

In the state shown in FIG. 20C, six anodic electrodes 12 located at the intersection of the first row and the fourth column, the intersection of the fourth row and the fourth column, the intersection of the sixth row and the fourth column, the intersection of the seventh row and the fourth column, the intersection of the ninth row and the fourth column, and the intersection of the tenth row and the fourth column are in the first state, while the other anodic electrodes 12 are in the second state. Meanwhile, three cathodic electrodes 13 located in the third to fifth columns are in the fourth state, while the other cathodic electrodes 13 are in the third state.

In each of the state shown in FIG. 20A, the state shown in FIG. 20B and the state shown in FIG. 20C, the anode-cathode distance is 0.2050 cm, and the total anode cathode area is 1.1420 $cm^2$. Thus, since all of the previously-described conditions [1] to [5] are satisfied, presentation of tactile sensations can be suitably performed.

In the present embodiment, the number of cathodic electrodes 13 is smaller than the number of the anodic electrodes 12. Therefore, it is possible to reduce the number of cathodic electrodes 13 that are to be controlled while improving the resolution of tactile sensations that can be presented, so that circuitry and driving can be further simplified.

The number of cathodic electrodes 13 in the fourth state is not limited to a plurality as exemplified in the embodiments, and may be one. For example, in the tactile sensation presenting device 300 of Embodiment 3, if the distance between the anodic electrodes 12 located in the first row and the cathodic electrode 13 located in the second row is greater than 1.0 mm, when a tactile sensation is presented at portions corresponding to the anodic electrodes 12 in the first row, the cathodic electrode 13 in the first row are the only cathodic electrode 13 located within 1.0 mm from the anodic electrodes 12 in the first row, so that only one cathodic electrode 13 in the first row is in the fourth state.

[Electrode Materials]

As the materials of the anodic electrodes 12, for example, gold, platinum or titanium can be suitably used. Also, carbon-based materials such as electrically-conductive carbon black, carbon nanotubes, graphene, and electrically-conductive metal oxides such as ITO (indium tin oxide) can be suitably used. When these materials are used as the materials of the anodic electrodes 12, electrolysis of the anodic electrodes 12 can be prevented.

The materials of the cathodic electrodes 13 are not particularly limited but can be selected from a variety of electrically-conductive materials. From the viewpoint of mass productivity, it is preferred that the materials of the cathodic electrodes 13 are the same as the materials of the anodic electrodes 12.

Embodiments of the present invention are widely applicable to electrical stimulation type tactile sensation presenting devices that are configured to present tactile sensations by electrical stimulation.

This application is based on Japanese Patent Applications No. 2023-147196 filed on Sep. 11, 2023 and No. 2024-80073 filed on May 16, 2024, the entire contents of which are hereby incorporated by reference.

What is claimed is:

1. A tactile sensation presenting device comprising:

at least one tactile sensation presenting section capable of presenting a tactile sensation by electrical stimulation; and a control section capable of controlling the at least one tactile sensation presenting section, wherein each of the at least one tactile sensation presenting section includes a support having a major surface, a plurality of anodic electrodes provided on the major surface of the support, the plurality of anodic electrodes being arrayed in a matrix with an array pitch of 1.5 mm or smaller, and a plurality of cathodic electrodes provided on the major surface of the support so as not to overlap the plurality of anodic electrodes as viewed in plan, the plurality of cathodic electrodes being arrayed with an array pitch equal to or greater than the array pitch of the plurality of anodic electrodes, each of the plurality of cathodic electrodes having a greater area than each of the plurality of anodic electrodes, wherein the control section is capable of independently switching each of the plurality of anodic electrodes between a first state where the anodic electrode is supplied with an anodic potential and a second state where the anodic electrode is supplied with a floating potential and the control section is capable of independently switching each of the plurality of cathodic electrodes between a third state where the cathodic electrode is supplied with a cathodic potential and a fourth state where the cathodic electrode is supplied with a floating potential, and wherein when the tactile sensation presenting section presents a tactile sensation, the control section controls the tactile sensation presenting section such that at least any one of the plurality of anodic electrodes is in the first state, the other anodic electrodes than the first-state anodic electrode are in the second state, at least one of the plurality of cathodic electrodes which is at least within a distance of 1.0 mm or less from the first-state anodic electrode is in the fourth state, the other cathodic electrodes than the fourth-state cathodic electrode are in the third state, and a total area of the first-state anodic electrode and the third-state cathodic electrodes is equal to or greater than 0.7 $cm^2$.

2. The tactile sensation presenting device of claim 1, wherein the plurality of anodic electrodes are made of gold, platinum, titanium, a carbon-based material, or an electrically-conductive metal oxide.

3. The tactile sensation presenting device of claim 1, wherein the array pitch of the plurality of cathodic electrodes is greater than the array pitch of the plurality of anodic electrodes.

4. The tactile sensation presenting device of claim 1, wherein the number of the plurality of cathodic electrodes is equal to or smaller than the number of the plurality of anodic electrodes.

5. The tactile sensation presenting device of claim 1, wherein the number of the plurality of cathodic electrodes is smaller than the number of the plurality of anodic electrodes.

6. The tactile sensation presenting device of claim 1, wherein each of the plurality of cathodic electrodes has such a shape that surrounds at least one of the plurality of anodic electrodes as viewed in plan.

7. The tactile sensation presenting device of claim 6, wherein each of the plurality of cathodic electrodes has such a shape that surrounds two or more of the plurality of anodic electrodes as viewed in plan.

8. The tactile sensation presenting device of claim 1, wherein the plurality of cathodic electrodes are arrayed in a matrix.

9. The tactile sensation presenting device of claim 1, wherein the plurality of cathodic electrodes are arrayed in a single row and a plurality of columns, each of the plurality of cathodic electrodes having such a shape whose longitudinal direction is defined in a column direction.

10. The tactile sensation presenting device of claim 1, wherein the at least one tactile sensation presenting section presents a tactile sensation by electrical stimulation at a fingertip inner portion of a corresponding finger.

* * * * *